United States Patent
Chen et al.

(10) Patent No.: US 12,008,341 B2
(45) Date of Patent: Jun. 11, 2024

(54) SYSTEMS AND METHODS FOR GENERATING NATURAL LANGUAGE USING LANGUAGE MODELS TRAINED ON COMPUTER CODE

(71) Applicant: OpenAI Opco, LLC, San Francisco, CA (US)

(72) Inventors: Mark Chen, Cupertino, CA (US); Jaroslaw Tworek, San Francisco, CA (US); Ilya Sutskever, San Francisco, CA (US); Wojciech Zaremba, San Francisco, CA (US); Hee Woo Jun, San Francisco, CA (US); Henrique Ponde De Oliveira Pinto, San Francisco, CA (US)

(73) Assignee: OpenAI Opco, LLC, San Francisco, CA (US)

( * ) Notice: Subject to any disclaimer, the term of this patent is extended or adjusted under 35 U.S.C. 154(b) by 0 days.

(21) Appl. No.: 18/321,921

(22) Filed: May 23, 2023

(65) Prior Publication Data

US 2024/0020116 A1 Jan. 18, 2024

Related U.S. Application Data

(63) Continuation of application No. 18/321,852, filed on May 23, 2023.

(Continued)

(51) Int. Cl.
*G06F 8/30* (2018.01)
*G06F 8/33* (2018.01)
*G06F 8/73* (2018.01)

(52) U.S. Cl.
CPC ............... *G06F 8/30* (2013.01); *G06F 8/33* (2013.01); *G06F 8/73* (2013.01)

(58) Field of Classification Search
CPC ............... G06F 8/33; G06F 8/73; G06F 8/30
(Continued)

(56) References Cited

U.S. PATENT DOCUMENTS

| 10,831,449 B2 | 11/2020 | Huebra | |
|---|---|---|---|
| 2015/0100943 A1* | 4/2015 | Gabel et al. | G06F 8/30 717/106 |

(Continued)

FOREIGN PATENT DOCUMENTS

| CN | 110018820 B | 8/2022 |
|---|---|---|
| WO | 2021/017025 A1 | 2/2021 |

OTHER PUBLICATIONS

Mark Chen et al., "Evaluating Large Language Models Trained on Code", arXiv.org, Cornell University Library, Jul. 7, 2021, pp. 1-11.
(Continued)

*Primary Examiner* — Wei Y Zhen
*Assistant Examiner* — Mohammed N Huda
(74) *Attorney, Agent, or Firm* — Finnegan, Henderson, Farabow, Garrett & Dunner LLP

(57) ABSTRACT

Disclosed herein are methods, systems, and computer-readable media for generating natural language based on computer code input. In an embodiment, a method may comprise one or more of: accessing a docstring generation model configured to generate docstrings from computer code; receiving one or more computer code samples; generating, using the docstring generation model and based on the received one or more computer code samples, one or more candidate docstrings representing natural language text, each of the one or more candidate docstrings being associated with at least a portion of the one or more computer code samples; identifying at least one of the one or more candidate docstrings that provides an intent of the at least a portion of the one or more computer code samples; and/or (Continued)

outputting, via a user interface, the at least one identified docstring with the at least a portion of the one or more computer code samples.

19 Claims, 8 Drawing Sheets

Related U.S. Application Data

(60) Provisional application No. 63/389,326, filed on Jul. 14, 2022.

(58) Field of Classification Search
USPC .......................................................... 717/123
See application file for complete search history.

(56) References Cited

U.S. PATENT DOCUMENTS

| | | | |
|---|---|---|---|
| 2020/0097261 A1* | 3/2020 | Smith et al. | G06F 8/33 |
| 2021/0357187 A1 | 11/2021 | Clement et al. | |
| 2021/0357210 A1 | 11/2021 | Clement et al. | |
| 2022/0244937 A1* | 8/2022 | Prasad et al. | G06F 8/65 |
| 2022/0244952 A1* | 8/2022 | Breslav et al. | G06F 8/33 |
| 2023/0029250 A1* | 1/2023 | Abdelaziz et al. | G06F 8/73 |

OTHER PUBLICATIONS

"GPT-3—Wikipedia", Apr. 5, 2023, Retrieved from the Internet: URL:https://web.archive.org/web/2023040522 5052/ https://en.wikipedia.org/wiki/GPT-3 [retrieved on Jan. 1, 2024].
European Patent Office, Int'l Search Report in Application No. PCT/US2023/036505 (Feb. 8, 2024), 4 pages.

* cited by examiner

SYSTEMS AND METHODS FOR GENERATING NATURAL LANGUAGE USING LANGUAGE MODELS TRAINED ON COMPUTER CODE

CROSS-REFERENCE TO RELATED APPLICATIONS

This application is continuation of U.S. patent application Ser. No. 18/321,852, filed on May 23, 2023, which claims priority to U.S. Provisional Application No. 63/389,326, filed on Jul. 14, 2022. The disclosures of the above-referenced applications are expressly incorporated herein by reference in their entireties.

FIELD OF DISCLOSURE

The disclosed embodiments generally relate to systems, devices, methods, and computer readable media for generating computer code based on natural language input or generating natural language based on computer code input.

BACKGROUND

Extant method and systems for writing or explaining computer code lack integration with natural language processing models to increase efficiency and accuracy. Conventional methods and systems also require extensive knowledge of various programming languages and syntax to be utilized properly and effectively. Further, conventional methods and systems lack a capability to understand the context of programming tasks in order to generate code that is tailored to a given context or environment. Additionally, conventional methods and systems lack an ability to continually learn and improve through interaction with users, feedback, and/or self-generated data.

The inventors here have recognized several technical problems with such conventional methods and systems. These technical problems include a time-consuming and repetitive process associated with writing or understanding code, particularly with regard to complex programming tasks, the potential for syntax errors and other bugs within code, the complex and time-consuming task of memory management, the challenges associated with developing programs that work across multiple programming languages and platforms, and the advanced skills and knowledge that are required for writing code, particularly highly complex code.

SUMMARY

Embodiments of the present disclosure present technological improvements as solutions to one or more of the above-mentioned technical problems recognized by the inventors in conventional systems. For example, in an embodiment, a method for generating computer code based on natural language input may include receiving a docstring representing natural language text specifying a digital programming result; generating, using a trained machine-learning model and based on the docstring, one or more computer code samples configured to produce respective candidate results; causing each of the one or more computer code samples to be executed; identifying, based on the executing, at least one of the computer code samples configured to produce a particular candidate result associated with the digital programming result; and/or performing at least one of: outputting, via a user interface, the at least one identified computer code sample, compiling the at least one identified computer code sample, transmitting the at least one identified computer code sample to a recipient device, storing the at least one identified computer code, or re-executing the at least one identified computer code sample.

According to some disclosed embodiments, a method may further comprise verifying each of the one or more executed computer code samples, wherein verifying includes computing a functional correctness score for each of the executed one or more computer code samples, wherein the identifying at least one of the computer code samples is based on the functional correctness score.

Consistent with some disclosed embodiments, the trained machine learning model may be fine-tuned based on verified computer code samples.

According to some disclosed embodiments, a method may further comprise verifying each of the one or more generated computer code samples, wherein verifying includes evaluating each of the one or more generated computer code samples based on at least one unit test. In some embodiments, identifying at least one of the computer code samples may further be based on the verifying. In some embodiments, the trained machine learning model may be fine-tuned based on verified computer code samples. In some embodiments, verifying may further include evaluating each of the one or more generated computer code samples based on a threshold associated with the at least one unit test.

Consistent with some disclosed embodiments, each of the one or more generated computer code samples may be associated with at least one text token. In some embodiments, each of the one or more generated computer code samples may further be associated with at least one whitespace token.

According to some disclosed embodiments, a method may further comprise outputting, via the user interface, the particular candidate result of the at least one identified computer code sample.

According to some disclosed embodiments, the trained machine learning model may be fine-tuned based on at least one of a public web source or software repository. In some embodiments, the trained machine learning model may be fine-tuned based on a set of training problems constructed from examples within the at least one public web source or software repository.

Consistent with some disclosed embodiments, identifying at least one of the computer code samples may further be based on a mean-log probability.

In some embodiments, at least a portion of the one or more computer code samples may be caused to be executed in a sandbox computing environment.

According to some disclosed embodiments, a method may further comprise outputting, via the user interface, a definition of a function, method, class, or module associated with the outputted at least one identified computer code sample.

In some embodiments, the trained machine learning model may be developed by applying training data comprising annotated computer code to a precursor model comprising a machine learning model trained on natural language prompts. Consistent with some disclosed embodiments, the trained machine learning model may further be trained using an execution result of the causing of each of the one or more computer code samples to be executed. In some embodiments, the trained machine learning model may comprise a plurality of layers, at least one of the layers having a transformer decoder architecture.

According to some disclosed embodiments, a system for generating computer code based on natural language input may include at least one memory storing instructions and at least one processor configured to execute the instructions to perform operations. In some embodiments, the operations may comprise receiving a docstring representing natural language text specifying a digital programming result; generating, using a trained machine-learning model and based on the docstring, one or more computer code samples configured to produce respective candidate results; causing each of the one or more computer code samples to be executed; identifying, based on the executing, at least one of the computer code samples configured to produce a particular candidate result associated with the digital programming result; and/or performing at least one of: outputting, via a user interface, the at least one identified computer code sample, compiling the at least one identified computer code sample, transmitting the at least one identified computer code sample to a recipient device, storing the at least one identified computer code, or re-executing the at least one identified computer code sample.

According to some disclosed embodiments, a non-transitory computer-readable medium may include instructions that are executable by one or more processors to perform operations. In some embodiments, the operations may comprise receiving a docstring representing natural language text specifying a digital programming result; generating, using a trained machine-learning model and based on the docstring, one or more computer code samples configured to produce respective candidate results; causing each of the one or more computer code samples to be executed; identifying, based on the executing, at least one of the computer code samples configured to produce a particular candidate result associated with the digital programming result; and/or performing at least one of: outputting, via a user interface, the at least one identified computer code sample, compiling the at least one identified computer code sample, transmitting the at least one identified computer code sample to a recipient device, storing the at least one identified computer code, or re-executing the at least one identified computer code sample.

According to some disclosed embodiments, a method for generating natural language based on computer code input may comprise accessing a docstring generation model configured to generate docstrings from computer code, receiving one or more computer code samples, generating, using the docstring generation model and based on the received one or more computer code samples, one or more candidate docstrings representing natural language text, each of the one or more candidate docstrings being associated with at least a portion of the one or more computer code samples, identifying at least one of the one or more candidate docstrings that provides an intent of the at least a portion of the one or more computer code samples, and/or outputting, via a user interface, the at least one identified docstring with the at least a portion of the one or more computer code samples.

Consistent with some disclosed embodiments, the docstring generation model may further generate a similarity between the intent and an additional natural language text. In some embodiments, the docstring generation model may further be trained using the outputted at least one identified docstring in association with the at least a portion of the one or more computer code samples.

According to some disclosed embodiments, the docstring generation model may be trained using concatenated strings, each concatenated string comprising at least two of a function signature, a reference solution, or a docstring. In some embodiments, the docstring generation model may further be trained by minimizing a negative log-likelihood associated with the docstring in each concatenated string.

Consistent with some disclosed embodiments, identifying at least one of the one or more candidate docstrings may be based on a correctness score computed for each candidate docstring.

According to some disclosed embodiments, a method may further comprise verifying each of the one or more candidate docstrings, wherein verifying includes determining a correctness score for each of the one or more candidate docstrings, wherein the identifying at least one of the one or more candidate docstrings is based on the determined correctness score. In some embodiments, the docstring generation model may be fine-tuned based on verified candidate docstrings.

According to some disclosed embodiments, a method may further comprise ranking the one or more candidate docstrings based on the determined correctness score, wherein identifying one of the one or more candidate docstrings is based on selecting a top-k candidate docstring.

Consistent with some disclosed embodiments, the docstring generation model may be a trained machine learning model. In some embodiments, the trained machine learning model may have between 10 billion and 14 billion parameters. In some embodiments, the trained machine learning model may comprise a plurality of layers, at least one of the layers having a transformer decoder architecture. In some embodiments, the transformer decoder architecture may include at least one of a masked self-attention head or a feed-forward network.

According to some disclosed embodiments, the docstring generation model may be fine-tuned based on at least one of a public web source or software repository. In some embodiments, the docstring generation model may be fine-tuned based on a set of training data constructed from examples within the at least one public web source or software repository.

According to some disclosed embodiments, identifying at least one of the one or more candidate docstrings may further be based on a mean-log probability.

In some embodiments, the docstring generation model may be developed by applying training data comprising annotated computer code to a precursor model comprising a machine learning model trained on natural language prompts.

In some embodiments, a method may further comprise training a machine learning model used for generating computer code based on natural language input using training data comprising the outputted at least one identified docstring in association with the at least a portion of the one or more computer code samples.

According to some disclosed embodiments, a system for generating natural language based on computer code input may include at least one memory storing instructions and at least one processor configured to execute the instructions to perform operations. In some embodiments, the operations may comprise accessing a docstring generation model configured to generate docstrings from computer code, receiving one or more computer code samples, generating, using the docstring generation model and based on the received one or more computer code samples, one or more candidate docstrings representing natural language text, each of the one or more candidate docstrings being associated with at least a portion of the one or more computer code samples, identifying at least one of the one or more candidate docstrings that provides an intent of the at least a portion of the one or more computer code samples, and/or outputting, via a user interface, the at least one identified docstring with the at least a portion of the one or more computer code samples.

According to some disclosed embodiments, a non-transitory computer-readable medium may include instructions that are executable by one or more processors to perform operations. In some embodiments, the operations may comprise accessing a docstring generation model configured to generate docstrings from computer code, receiving one or more computer code samples, generating, using the docstring generation model and based on the received one or more computer code samples, one or more candidate docstrings representing natural language text, each of the one or more candidate docstrings being associated with at least a portion of the one or more computer code samples, identifying at least one of the one or more candidate docstrings that provides an intent of the at least a portion of the one or more computer code samples, and/or outputting, via a user interface, the at least one identified docstring with the at least a portion of the one or more computer code samples.

Other systems, methods, and computer-readable media are also discussed within.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
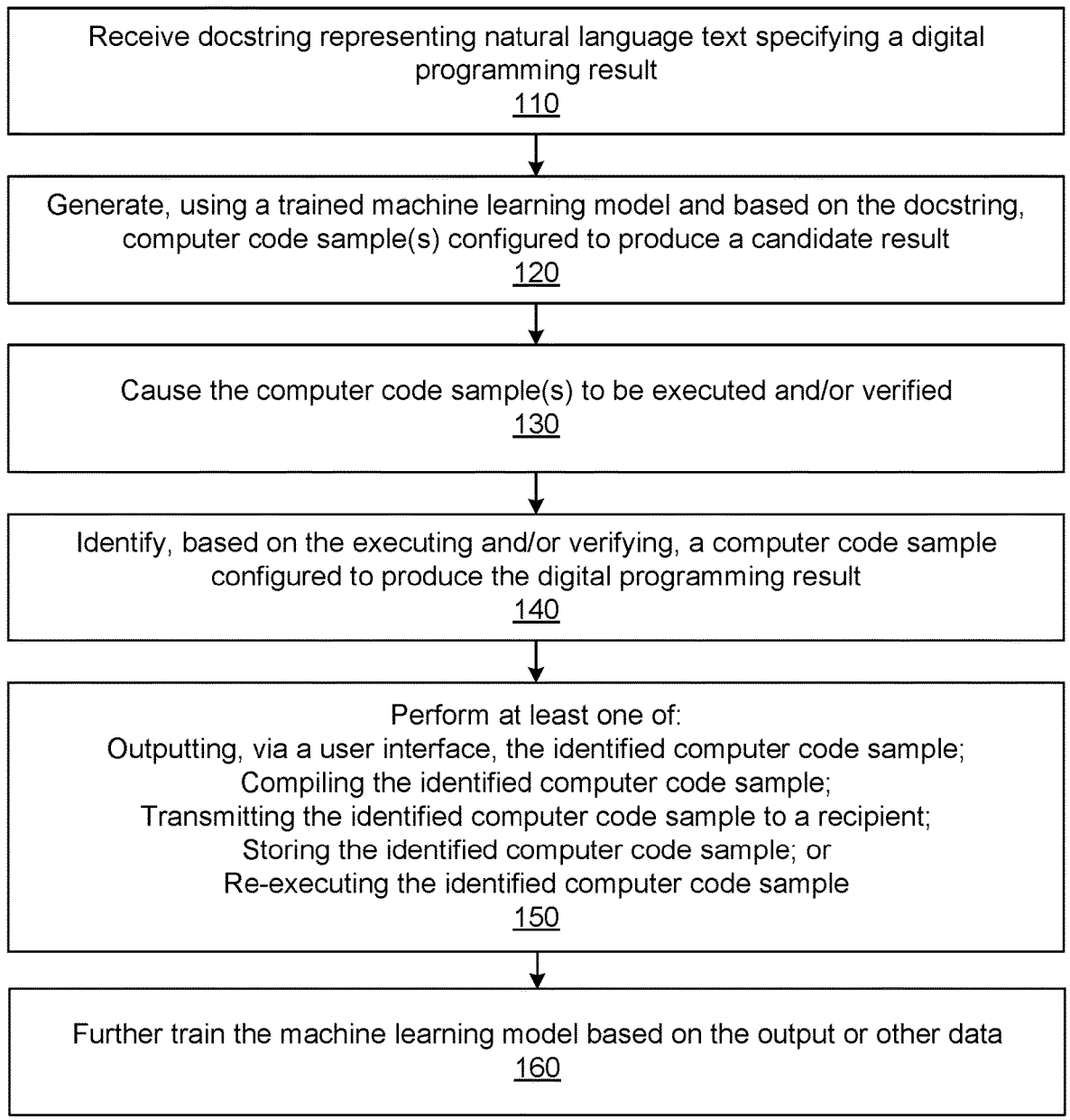
FIG. 1 is a flow diagram which illustrates an exemplary method according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized preloaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information according to the model being used, which would otherwise be impractical, if not impossible, for the human mind to accomplish. The results, including the results of the embodiments discussed herein, are astounding across a variety of applications. For example, an AI system can be configured to autonomously navigate vehicles, automatically recognize objects, instantly generate natural language, understand human speech, and generate artistic images.

The methods, systems, and media disclosed herein provide technical improvements to the fields of artificial intelligence and natural language processing technology. For example, embodiments of the present disclosure increase the efficiency and accuracy of methods for synthesizing computer programming code and standalone computer code functions, as well as building entire computer programs, from input containing natural language text. For instance, a machine learning model consistent with disclosed embodiments may output computer code in response to a user input describing a problem to be solved in natural language. As a result, the user may not be required to have any programming knowledge or experience in order to create executable computer code which provides a solution to the problem. In some embodiments, the machine learning model may be trained using incredibly large datasets of code and/or natural language, which may be sourced from disparate places, enabling the model to learn to generate, and generate, functionally accurate code in response to natural language input. The present disclosure also provides methods for automatically evaluating the correctness of synthesized code, e.g., via unit testing or heuristic ranking instead of manual evaluation. The present disclosure also provides improved methods for generating natural language descriptions for computer code. For instance, a machine learning model consistent with disclosed embodiments may output natural language text in response to receiving an input containing programming code. As a result, a user may not be required to have any programming knowledge or experience in order to understand the purpose or functionality associated with that computer code. The present disclosure further improves machine learning model performance by providing methods and systems for fine-tuning trained machine learning models based on known correctly implemented functions, known associations, and other known data. The present disclosure also improves machine learning model performance by providing methods and systems for generating and utilizing unit tests to improve the decision-making capabilities of the machine learning model.

Practical application examples of the present disclosure may include converting comments into computer code, providing predictive code suggestions based on user comments, auto-filling computer code (e.g., repetitive code, routine coding tasks), suggesting alternative code based on user comments, and identifying redundant or unnecessary code to produce faster and more efficient code which requires less memory and resources. Other practical application examples include generating frameworks (e.g., frontend user interface, or UX, frameworks) which match a user's preferences or coding style based on user comments, providing and executing terminal commands based on user comments (e.g., natural language input), providing automatic description of user-selected computer code, and providing intelligent templates for building machine learning models and/or unit tests. Overall, the present disclosure may be used to assist programmers in their work, allowing them to generate code snippets, functions, and even entire programs, based on natural language descriptions, in several programming languages including Python, Java, C++, Ruby, and JavaScript.

Some disclosed embodiments automate many programming tasks, many of which are prone to human error and/or are incredibly time intensive, allowing developers to focus on higher-level tasks and increasing productivity. For example, developers may quickly prototype and experiment with different programming concepts, generating code snippets and functions in a matter of seconds, allowing them to test and refine their ideas quickly. The present disclosure may also help non-programmers to learn programming, by allowing them to write code using natural language descriptions or to understand the purpose or functionality of particular code.

Illustrative embodiments of the present disclosure are described below. In one embodiment, a method for generating computer code based on natural language input may comprise receiving a docstring representing natural language text specifying a result. A docstring, as used herein, may refer to any text including a comment, documentation, sentence, paragraph, word, or any natural language phrase. In some embodiments, a docstring may be generated based on a natural language input. In some embodiments, a combination of computer code and at least one docstring may be generated based on a natural language input. In some embodiments, a docstring may adhere to a format (e.g., syntax) that may not be fully understandable to a human. A docstring may provide information about a function, method, module, or class related to using or interacting with computer programming code. For example, a docstring may provide information on what a function (or any code) does, what arguments are accepted by a function, a return value produced by a function (or any code), any potential exceptions raised by a function (or any code), how to use a function (or any code), or an expected behavior of a function (or any code). Natural language text, used herein, may refer to any text written or spoken in a human language to express thoughts, ideas, or information. Natural language text may be characterized by fluidity and variability, and it may include grammar, syntax, and/or semantics. For example, natural language text may include any sequence of words or sentences that convey meaning and that may be understood by a human. A result, as used herein, may refer to an outcome, effect, achievement, impact, or product. For example, a result may include a digital programming result (e.g., a program output, a program behavior, a computing functionality, a set of generated data elements), a generated automatic computerized action, a generated image or other media, or any other outcome which may be caused by programming code.

In some embodiments, a method may also comprise generating, using a trained machine-learning model, and based on the docstring, one or more computer code samples configured to produce respective candidate results. A trained machine-learning model may refer to a mathematical or computational representation that is created and trained using machine learning algorithms to make predictions or decisions based on received input. A machine learning model may be trained based on examples or past data (e.g., training data) to generalize and/or make predictions on new, unseen data based on identified patterns, relationships, or trends in the past data. In some embodiments, a machine learning model may be stored in ML algorithms database 890.

Training data may include, e.g., datasets collected from a variety of public software repositories (e.g., hundreds, thousands, millions, or even billions of datasets). In some embodiments, training data may include text (e.g., natural language) and/or code (e.g., compiled or uncompiled code). Training data may be scraped from one or more sources, such as webpages maintained at one or more websites. In some embodiments, the data within such datasets may initially be filtered to exclude files which, e.g., were likely automatically generated, have a large average line length (e.g., greater than 100), have a large maximum line length (e.g., greater than 1,000), or contain a small percentage of alphanumeric characters. After filtering, the filtered data may be input as training data to train a machine learning model. In some embodiments, training the machine learning model may include a linear warmup in conjunction with other learning rate scheduling techniques, such as learning rate decay or cyclical learning rates, to further optimize the training process and enhance model performance (e.g., a 175 step linear warmup and a cosine learning rate decay). During the warmup phase, the learning rate may initially be set to a low value and may then be linearly increased over a certain number of training steps or epochs. Non-linear increases may also be used. This may allow the model to start with smaller learning rates, which help it explore the parameter space more effectively and avoid large and potentially harmful updates at the beginning of training when the model's parameters are randomly initialized. By increasing the learning rate linearly (or with any increasing trend), the model may quickly adjust its parameters and adapt to the training data while avoiding abrupt and potentially destabilizing changes. Once the warmup phase is completed, the learning rate may be decreased according to a predefined schedule, such as using a learning rate decay or employing adaptive optimization methods like Adam or Adagrad. For example, the machine learning model may be trained for a total of 100 billion tokens, using an Adam optimizer with 1=0.9, 2=0.95, E=10−8, and a weight decay coefficient of 0.1. Of course, the machine learning model may be trained for a total of other amounts of tokens, such as millions of tokens (e.g., 1 million, 10 million, 100 million).

Figure 8:
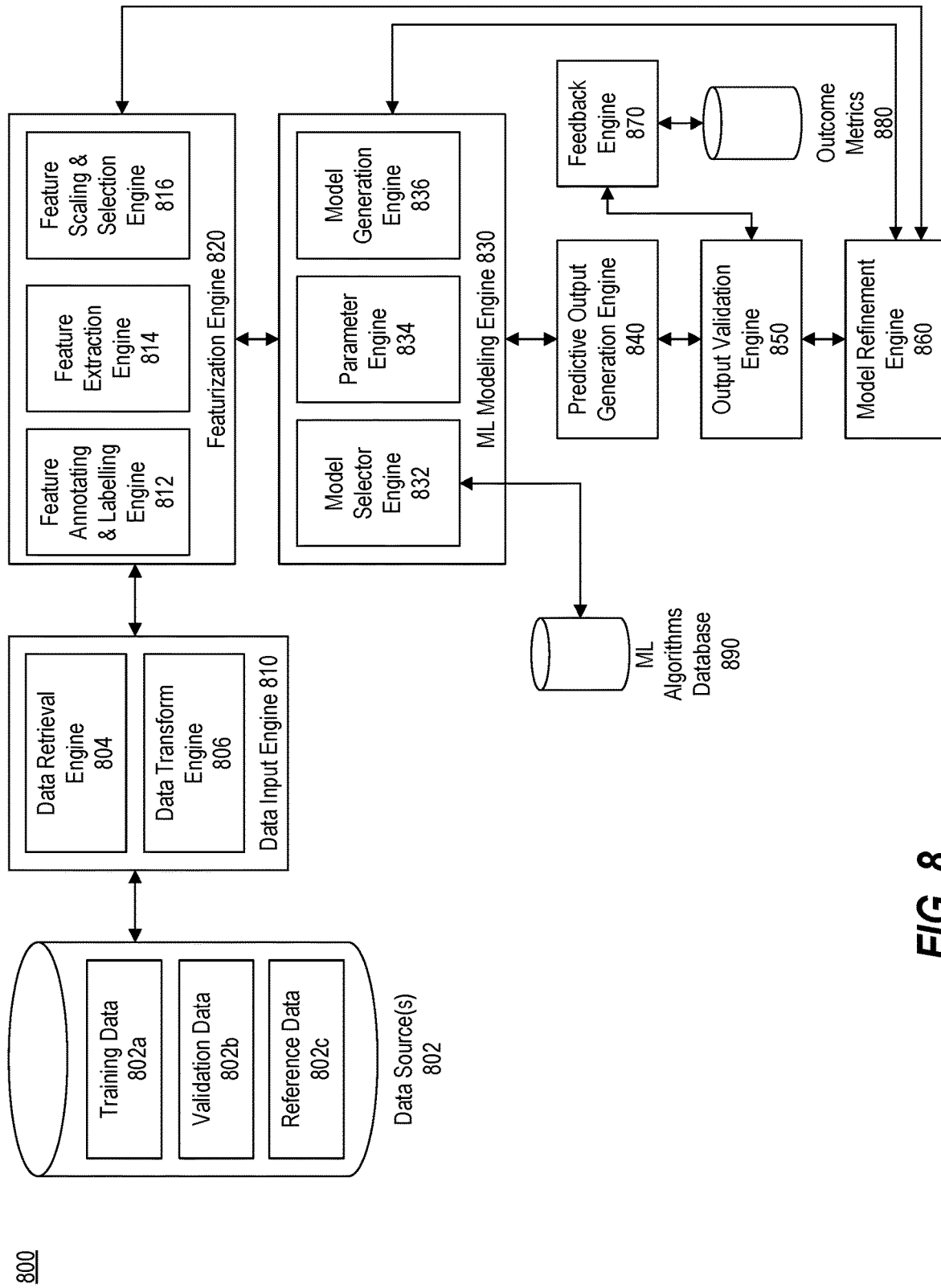
FIG. 8 is a block diagram illustrating an exemplary machine learning platform for implementing various aspects of this disclosure, according to some embodiments of the present disclosure.

As an example, a trained machine learning model may include a linear regression model, a decision tree model, a random forest model, a support vector machine model, a convolutional neural network, a recurrent neural network, or another artificial intelligence model, such as those discussed with respect to FIG. 8. A computer code sample, as used herein, may refer to any combination of a phrase, function, procedure, script, string, or concatenation of computer programming code. A candidate result, as used herein, may refer to a potential or possible outcome which may or may not equate to the desired result indicated by the natural language input (e.g., a candidate result, or candidate solution, may not necessarily solve the problem at hand). In some embodiments, a higher number of computer code samples provided by a trained machine learning model may result in more accurate candidate results based on the input docstring. For example, a machine learning model that outputs one computer code sample in response to an input docstring provides one candidate result and no other potential computer code samples which may provide other candidate results; however, a machine learning model that outputs 100 computer code samples in response to an input docstring provides 100 respective candidate results, any one of which may provide a desired result.

Consistent with some disclosed embodiments, the trained machine learning model may be developed by applying training data comprising annotated computer code to a precursor model comprising a machine learning model trained on natural language prompts. In some embodiments, training data may also comprise a set of training problems constructed from correctly implemented (e.g., verified or validated) standalone functions. Such standalone functions may be collected from programming web sources (e.g., competitive programming websites or software development interview preparation websites) and/or from software repositories (e.g., open source repositories or projects utilizing continuous integration). For example, such sources may provide problem statements, function signatures, and solutions, which may be collected and used as training data, using the problem description as the docstring. As a further example, competitive programming websites may provide additional unit test data for determining functional correctness (based on hidden unit tests used by such websites to automatically judge functional correctness of submissions made by developers to the website). As another example, additional unit tests may be created based on examples found in the problem statements, and/or additional test cases may be extracted by submitting incorrect solutions, the combination of which may be used to curate a training data set. As yet another example, additional programming problems may be curated from open source projects utilizing continuous integration (e.g., by tracing and collecting inputs and outputs for functions called during integration testing in order to create unit tests for the functions). This may be done, e.g., by following build and test commands in a continuous integration configuration file which are used to setup a virtual environment, install dependencies, and run integration tests. Example continuous integration repositories include GitHub repositories using Travis and/or Tox frameworks, as well as pip packages within the Python Package Index (PyPI).

In some embodiments, a method may further comprise causing each of the one or more computer code samples to be executed. Executed (or executing), as used herein, may refer to running or carrying out of the computer code sample such that the instructions contained within the computer code sample may be processed by a processor or interpreted by an interpreter or a virtual machine and performed to complete one or more tasks. A task, as used herein, may refer to, e.g., interacting with input and/or output devices, accessing data, changing data, transmitting digital information, performing calculations, modifying variables, making decisions, and/or carrying out other computerized operations as defined by the computer code sample. Candidate results may include, e.g., a segment of code configured to perform a particular functionality or functionalities, provision of printed messages, provision of updated data values, changes in a computerized state, interactions with external systems or resources, performance of reading from files, performance of writing to files, performance of accessing databases, performance of making network requests, and/or data resulting from the performance of one or more of these operations.

In some embodiments, a method may also comprise identifying, based on the executing, at least one of the computer code samples configured to produce a particular candidate result associated with the digital programming result (e.g., a candidate result corresponding to the digital programming result, a candidate result most closely corresponding to the digital programming result, or a candidate result corresponding to a performance metric). Identifying, as used herein, may refer to recognizing, distinguishing, or determining. For example, based on the executing of two computer code samples generated by the machine learning model, a first executed computer code sample may be found to cause a result that does not correspond to (e.g., does not meet a tolerance threshold value) the result indicated by the natural language input, and a second executed computer code sample may be found to cause a result that does correspond to (e.g., meets tolerance threshold value) the result desired based on the natural language input. In such a scenario, the second computer code sample may be identified while the first computer code sample may be disregarded or discarded.

In some embodiments, a method may comprise performing at least one of outputting, via a user interface, the at least one identified computer code sample, compiling the at least one identified computer code sample, transmitting the at least one identified computer code sample to a recipient device, storing the at least one identified computer code sample (e.g., locally and/or remotely), and/or re-executing the at least one identified computer code sample.

Outputting, as used herein, may refer to sending, transmitting, producing, or providing. A user interface, as used herein, may refer to any means through which a user interacts with a software application or computer system. For example, a user interface may include a graphical user interface (GUI), a command line interface, a touch user interface, a voice user interface, or a virtual reality user interface.

Compiling, as used herein, may refer to a process of converting human-readable source code written in a programming language into machine-readable code (i.e., not readily understandable by a human) that can be executed by a computer or a target platform. For example, a computer code sample may be translated into a lower-level representation, such as machine code or bytecode, which may then be understood and executed by a processor (while not being understandable to a human).

Transmitting, as used herein, may refer to a process of sending or transferring data or information from one location or device to another. Transmitting may involve the propagation or communication of data over a medium or network, allowing it to be received and accessed by an intended recipient (e.g., the user) or a recipient device of the user.

Storing, as used herein, may refer to any act of retaining and/or preserving data, information, or content in a way that allows it to be accessed, retrieved, and/or used at a later time. Storing may involve the process of saving or recording data in a durable and organized manner for future reference or use.

It is appreciated that the technical embodiments for generating computer code based on natural language input, as discussed herein, implement a solution rooted in computer technology rather than simply following rules. Further, it is appreciated that such technical embodiments contribute to solving the complex problem of automating computer code generation by training an artificial intelligence model using a vast amount of data and utilizing the artificial intelligence model to generate accurate predictions of computer code.

In certain embodiments, a method may further comprise verifying each of the one or more executed computer code samples, wherein verifying may include computing a functional correctness score for each of the executed one or more computer code samples, wherein the identifying at least one of the computer code samples may be based on the functional correctness score. In some embodiments, a functional correctness score may be based on comparing functional behavior and/or output of a computer code sample to validation data representing a desired or known behavior and/or result. Consistent with some disclosed embodiments, verifying may include evaluating each of the one or more generated computer code samples based on at least one unit test without necessarily providing a functional correctness score. Further consistent with some disclosed embodiments, identifying at least one of the computer code samples may further be based on the verifying based on at least one unit test.

Verifying, as used herein, may refer to validating, confirming, or establishing truth, authenticity, validity, or accuracy. A functional correctness score, as used herein, may refer to a value indicating an amount of unit tests passed (e.g., number of unit sets passed out of a full set of unit tests) by a particular computer code sample. A unit test, as used herein, may refer to a software test or check where an individual component (e.g., computer code sample or a portion thereof) may be tested in isolation to ensure proper function. A goal of a unit test may be to validate behavior and/or functionality of a small, self-contained piece of computer code and ensure that the piece of computer code operates as intended and meets specific desired requirements (e.g., that the computer code sample configured to provide a candidate result actually provides the desired result). Unit tests may be written by developers, or may be generated by a machine learning model, or a combination of both. Unit tests may be based on known input-output data combinations (e.g., test cases), known behavioral data (e.g., properties, invariants, edge data), or a combination of both. A set of unit tests may thereby be provided for verifying one or more computer code samples generated according to the present disclosure, and a functional correctness score may be computed based on the number of unit tests within a set of unit tests that a particular computer code sample passes.

Consistent with some disclosed embodiments, verifying may further include evaluating each of the one or more generated computer code samples based on a threshold associated with the at least one unit test. A threshold, as used herein, may refer to a value or boundary, which may be static or variable (e.g., dependent on another value), that determines whether a certain condition is met or not met, e.g., as determined by a unit test. As an example, a threshold may indicate a timeout value (e.g., 3 seconds) or another time-related value (e.g., execution time). A threshold may be used, e.g., to make binary decisions based on a continuous or probabilistic value, both of which may be determined by a unit test. A threshold may also be used to determine the outcome of a decision or to classify data into different categories. A threshold may further be used to determine that a computer code sample fails a unit test, e.g., when the computer code sample does not pass a unit test within a given time-related value.

Consistent with some disclosed embodiments, the trained machine learning model may be fine-tuned based on verified computer code samples. Fine-tuned, as used herein, may refer to a process of further training a trained machine learning model (e.g., initialized, partially trained, trained on a larger or more generic dataset) on a specific task or dataset to further improve its performance and adapt it to a specific domain or problem. Fine-tuning may allow the machine learning model to leverage the knowledge and learned representations from a larger, pre-existing model and refine them for a specific task at hand, e.g., using a smaller, task-specific dataset, producing more accurate output (e.g., output more closely corresponding to a desired output). During fine-tuning, a trained machine learning model's parameters may be adjusted or updated using a dataset that is representative of a target task. The objective of fine-tuning may be to adjust or update a machine learning model's learned features and weights to better align with the patterns and characteristics of a target task, which may lead to further improved performance and/or generalization.

Consistent with some disclosed embodiments, each of the one or more generated computer code samples may be associated with at least one text token. A token, as used herein, may refer to a unit or element of text that is used as a basic building block in natural language processing (NLP) or other machine learning tasks. A text token may represent a separate unit of meaning or linguistic component within a phrase or sentence. For example, a piece of text, such as a word, phrase, sentence, paragraph, or document, may be broken down into smaller units (e.g., text tokens) for further analysis. Text tokens may include, e.g., individual words, punctuation marks, or even smaller subword units (e.g., a portion of a word), depending on the specific tokenization strategy employed. Tokenization may refer to a process of splitting a text into tokens, which may be helpful in completing machine learning tasks including text classification, sentiment analysis, machine translation, and named entity recognition. In some embodiments, a token may be generated based on natural language input, such as by transforming the natural language input into a format understandable to a computerized model (but which may be impractical or impossible for a human to understand). By breaking down the text into tokens, it may be possible to apply statistical and machine learning techniques to analyze and process natural language data.

Consistent with some disclosed embodiments, each of the one or more generated computer code samples may further be associated with at least one whitespace token. A whitespace token, as used herein, may refer to a token (as previously described and exemplified) which represents an open space between words, punctuation, sentences, paragraphs, and other formations of text.

In some embodiments, a method may further comprise outputting, via a user interface, an associated result of the at least one identified computer code sample. An associated result, as used herein, may refer to the actual result which occurs from executing a computer code sample. As such, the method may include outputting both the computer code sample that is identified and/or the result of executing that computer code sample. In turn, a user may be provided with the identified computer code sample in combination with the associated result, which may confirm to the user that the identified computer code sample will provide the user's desired result.

Consistent with some disclosed embodiments, the trained machine learning model may be fine-tuned based (as previously described and exemplified) on at least one public web source or software repository. In some embodiments, a device (e.g., using a particular module, program, or application) may retrieve digital information from the one or more public web source or software repositories, such as by crawling one or more webpages, websites, and/or Hypertext Markup Language (HTML) code. A public web source, as used herein, may refer to any information or content that is accessible to the general public via the internet and/or the World Wide Web. A public web source may include websites, web pages, blogs, forums, news articles, social media posts, and other online resources that are publicly available and can be accessed by anyone with an internet connection. A software repository (also referred to as a package repository or a software source), as used herein, may refer to a centralized location comprising a collection of software components that are organized and managed to facilitate software development, distribution, and updates, and where software packages, libraries, and related files are stored and made available for distribution and installation. Non-limiting examples of software repositories include the Debian package repository, Ubuntu Software Center, PyPI (Python Package Index), npm (Node Package Manager), and GitHub repositories. The trained machine learning model may be fine-tuned based on at least one of packages (e.g., software components such as applications, libraries, drivers, and plugins), metadata (e.g., information associated with each package, such as version numbers, descriptions, dependencies, and other data relating to a particular software component), or text (e.g., blog entries, comments, descriptions), any or all of which may be stored in a software repository.

Consistent with some disclosed embodiments, the trained machine learning model may further be trained using an execution result of the causing of each of the one or more computer code samples to be executed. For example, the execution result(s) of the causing of each of the one or more computer code samples to be executed may serve as additional training data to the machine learning model. As such, the method may allow for the machine learning model to generate additional training data for itself, becoming more accurate as a result of self-generated training data, without requiring external data serving as additional training data.

Consistent with some disclosed embodiments, the trained machine learning model may comprise a plurality of layers, at least one of the layers having a transformer decoder architecture. A transformer decoder architecture, as used herein, may refer to a machine learning architecture comprising an encoder and a decoder, both of which are built on a self-attention mechanism, wherein the encoder focuses on encoding the input sequence, and the decoder generates the output sequence based on the encoded representation.

Consistent with some disclosed embodiments, the trained machine learning model may be either further trained or fine-tuned based on a set of training problems constructed from examples within the at least one public web source or software repository.

Consistent with some disclosed embodiments, identifying at least one of the computer code samples may further be based on a mean-log probability. A mean-log probability, as used herein, may refer to a value calculated by determining the logarithm of each predicted probability associated with a particular computer code sample (or other output provided by the machine learning model) and then calculating the average across all predictions. By taking the logarithm of predicted probabilities, the mean-log probability metric may provide a way to measure the machine learning model's confidence in its predictions. A higher mean-log probability may indicate that the machine learning model is assigning higher probabilities to correct output (e.g., correct computer code samples), thereby suggesting better performance. The mean-log probability metric may be particularly useful in cases where the magnitude of predicted probabilities is important, rather than just the correctness of a prediction made by the machine learning model. Additionally, or alternatively, other statistical values or techniques may be used. For example, one or more outliers may be removed prior to performing logarithm calculations. As another example, identifying at least one of the computer code samples may include determining a probability distribution.

Consistent with some disclosed embodiments, at least a portion of the one or more computer code samples may be caused to be executed in a sandbox computing environment. A sandbox computing environment, as used herein, may refer to a restricted and isolated environment (e.g., virtual computing environment) where software programs and processes are able to run securely without affecting any underlying system or applications not directly associated with the sandbox computing environment and/or using the computer code samples. A sandbox computing environment may thereby provide a controlled space for testing, experimentation, and executing potentially untrusted or unknown computer code samples as generated by the trained machine learning model.

In some embodiments, a method may further comprise outputting, via the user interface, a definition of a function, method, class, or module associated with the outputted at least one identified computer code sample. As such, the method may include outputting both the computer code sample that is identified and additional information related to that computer code sample. In turn, a user may be provided with the identified computer code sample in combination with the additional information related to the identified computer code sample, which may either confirm to the user that the identified computer code sample will provide the user's desired result or which may provide to the user helpful information related to one or more of the function, method, class, or module associated with the computer code sample.

According to other disclosed embodiments, an exemplary system may include at least one memory storing instructions and at least one processor configured to execute the instructions to perform a set of operations for generating computer code based on natural language input. The set of operations may mirror one or more of the steps of the method 100 described herein. As such, the system may be configured for receiving a docstring representing natural language text specifying a digital programming result. The system may further be configured for generating, using a trained machine learning model, and based on the docstring, one or more computer code samples configured to produce respective candidate results. The system may further be configured for causing the one or more generated computer code samples to be executed and/or verified. In some embodiments, the system may also be configured for identifying, based on the executing and/or verifying, a computer code sample configured to produce the digital programming result. Further, the system may be configured for performing at least one of outputting, via a user interface, the at least one identified computer code sample, compiling the at least one identified computer code sample, transmitting the at least one identified computer code sample to a recipient device, storing the at least one identified computer code, and/or re-executing the at least one identified computer code sample.

According to another embodiment of the present disclosure, a non-transitory computer readable medium comprising instructions to perform steps for generating computer code based on natural language input. The steps embodied in the instructions of the non-transitory computer readable medium may mirror one or more of the steps of the method 100 described herein. As such, the steps may be configured for receiving a docstring representing natural language text specifying a digital programming result. The steps may further be configured for generating, using a trained machine learning model, and based on the docstring, one or more computer code samples configured to produce respective candidate results. The steps may further be configured for causing the one or more generated computer code samples to be executed and/or verified. In some embodiments, the steps may also be configured for identifying, based on the executing and/or verifying, a computer code sample configured to produce the digital programming result. In some embodiments, the steps may further be configured for performing at least one of outputting, via a user interface, the at least one identified computer code sample, compiling the at least one identified computer code sample, transmitting the at least one identified computer code sample to a recipient device, storing the at least one identified computer code, and/or re-executing the at least one identified computer code sample.

The present disclosure may be used to perform a range of coding tasks based on natural language processing. Example tasks include code completion (e.g., suggesting code completions for developers as they write code; e.g., if a developer starts typing a line of code and then pauses, code snippets may be suggested to complete the task, which may save time and improve the accuracy of the code being written), automated testing (e.g., generating test cases and test code, which may help developers ensure that their code is functioning correctly and catch bugs from the outset), code refactoring (e.g., suggesting changes to existing code that can improve its efficiency, readability, and maintainability, which may help developers optimize their code and reduce technical debt), natural language processing (e.g., processing natural language queries and generating code based on those queries, which may be useful for developers who are not familiar with a particular programming language or who need to write code quickly), intelligent coding assistants (e.g., building intelligent coding assistants that can help developers perform complex coding tasks; e.g., a coding assistant may help a developer build a machine learning model or optimize a database query), code generation for low-code platforms (e.g., integrating with platforms designed to make it easier for non-technical users to build applications to help generate the code needed to build the application, which may help reduce the technical knowledge required to build an application and speed up the development process), code synthesis for code reviews (e.g., automatically generating code changes based on code review comments, which may save time and improve the efficiency of the code review process), rapid prototyping (e.g., quickly prototyping new ideas and testing out different approaches to coding problems, which may help developers iterate on their ideas more quickly and efficiently, code analysis and optimization (e.g., analyzing existing code and suggesting ways to improve it; e.g., suggesting ways to reduce the complexity of code, improve its performance, or reduce its memory footprint), and game development (e.g., generating code for game development, including game engines, physics simulations, and artificial intelligence algorithms, which may game developers create more complex and realistic games more efficiently.

Figure 3:
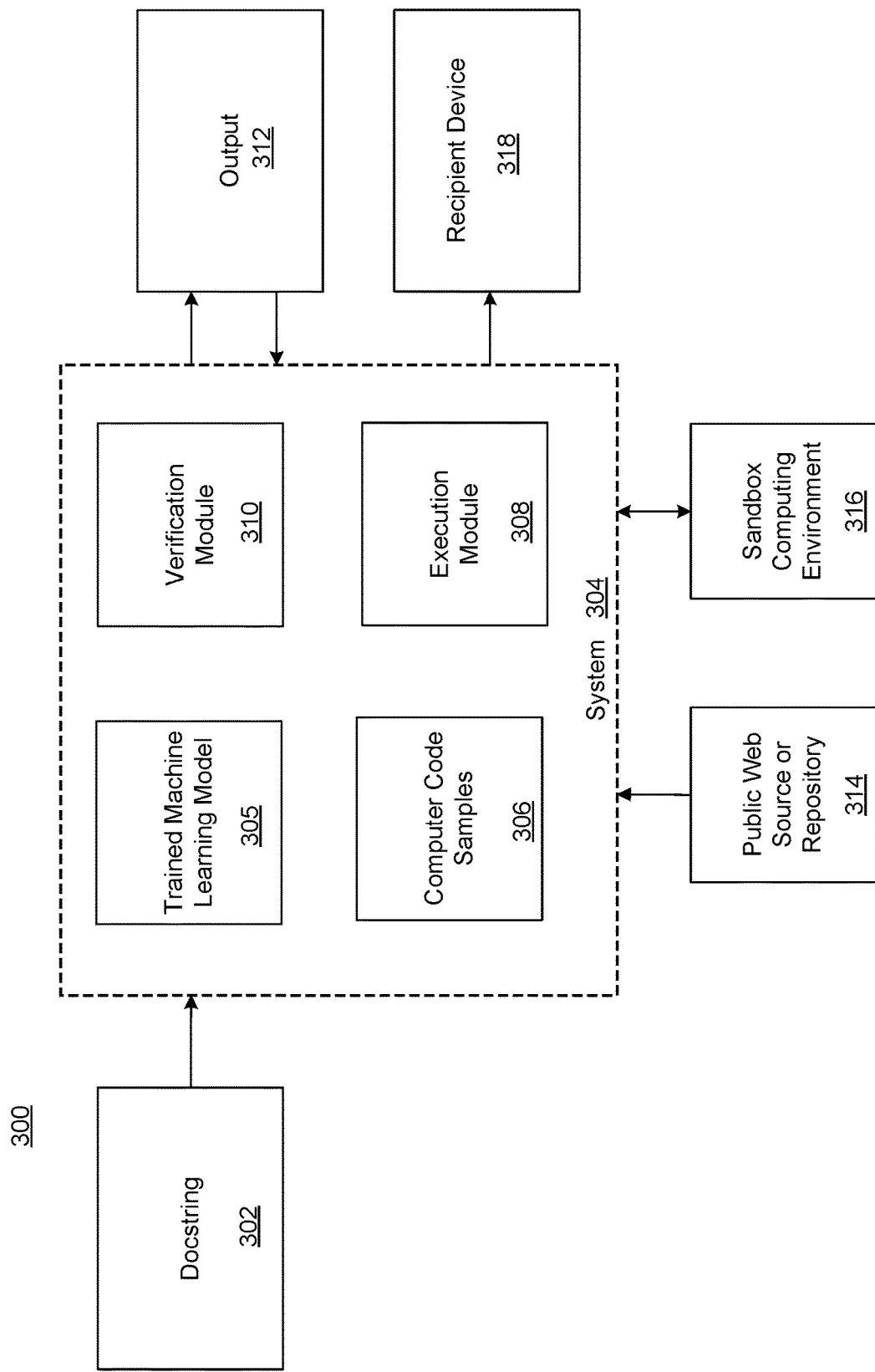
FIG. 3 is a block diagram illustrating an exemplary system for generating computer code from natural language input, in accordance with some embodiments of the present disclosure.
Figure 5:
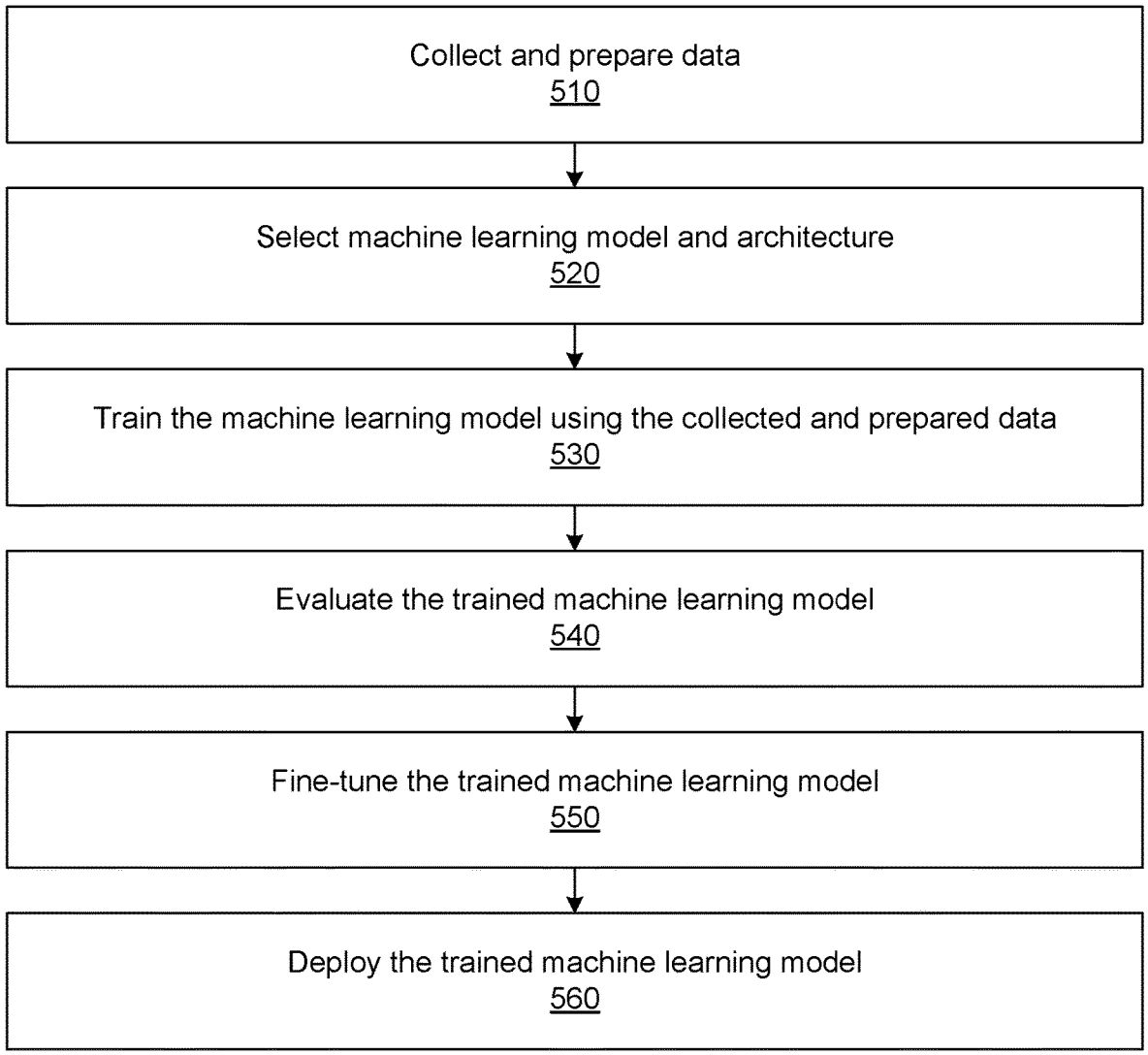
FIG. 5 is a flow diagram which illustrates an exemplary method for training a machine learning model, according to some disclosed embodiments.

Reference will now be made to FIGS. 1, 3, and 5, which illustrate exemplary embodiments of the present disclosure.

An exemplary method 100 for generating computer code based on natural language input, consistent with disclosed embodiments, such as those discussed herein, is illustrated in FIG. 1. The process shown in FIG. 1 or any of its constituent steps may be implemented using operating environment 700, system 800 (e.g., using at least one processor and at least one memory component), or any component thereof. The steps illustrated in FIG. 1 are exemplary and steps may be added, merged, divided, duplicated, repeated (e.g., as part of a machine learning process), modified, performed sequentially, performed in parallel, and/or deleted in some embodiments.

As illustrated in FIG. 1, an exemplary method 100 may include a step 110 of receiving a docstring representing natural language text specifying a digital programming result. As further illustrated in FIG. 1, an exemplary method 100 may also include a step 120 of generating, using a trained machine-learning model and based on the docstring, one or more computer code samples configured to produce respective candidate results. As also illustrated in FIG. 1, an exemplary method 100 may further include a step 130 of causing each of the one or more computer code samples to be executed. As shown in FIG. 1, an exemplary method 100 further may include a step 140 of identifying, based on the executing, at least one of the computer code samples configured to produce a particular candidate result associated with the digital programming result. As further shown in FIG. 1, an exemplary method 100 may also include a step 150 of performing at least one of outputting, via a user interface, the at least one identified computer code sample, compiling the at least one identified computer code sample, transmitting the at least one identified computer code sample to a recipient device, storing the at least one identified computer code, and/or re-executing the at least one identified computer code sample. As illustrated in FIG. 1, an exemplary method 100 may also include a step 160 of further training the machine learning model based on the output or based on other data.

FIG. 3 is a functional block diagram that describes an exemplary operating environment 300 for implementing the method of FIG. 1, according to some embodiments of the present disclosure. In some embodiments, the operating environment 300 may include a system 304 comprising at least one memory storing instructions (not shown) and at least one processor (not shown) configured to execute the instructions to perform a set of operations for generating computer code based on natural language input. System 304 may be an instance of and/or include features of system 500. The set of operations may mirror one or more of the steps of the method 100 described herein. As such, the system 304 may be configured for receiving a docstring 302 representing natural language text specifying a digital programming result. The system 304 may further be configured for generating, using a trained machine learning model 305, and based on the docstring 302, one or more computer code samples 306 configured to produce respective candidate results. In some embodiments, the machine learning model 305 may be trained using data from a public web source and/or repository 314. The system 304 may further be configured for causing the one or more generated computer code samples 306 to be executed via execution module 308 and/or verified via verification module 310. In some embodiments, the one or more generated computer code samples 306 may be executed or verified in a sandbox computing environment 316. In some embodiments, the system 304 may also be configured for identifying, based on the executing and/or verifying, a computer code sample configured to produce the digital programming result. Further, the system 304 may be configured for performing at least one of outputting 312, via a user interface (not shown), the at least one identified computer code sample, compiling the at least one identified computer code sample, transmitting the at least one identified computer code sample to a recipient device 318, storing the at least one identified computer code, and/or re-executing the at least one identified computer code sample.

An exemplary method 500 for training a machine learning model, consistent with disclosed embodiments, is illustrated in FIG. 5. In some embodiments, the machine learning model may be trained such that it may be configured to generate computer code based on natural language input, or natural language based on computer code input, as discussed herein. The process shown in FIG. 5 or any of its constituent steps may be implemented using operating environment 700, system 800 (e.g., using at least one processor and at least one memory component), or any component thereof.

The steps illustrated in FIG. 5 are exemplary and steps may be added, merged, divided, duplicated, repeated (e.g., as part of a machine learning process), modified, performed sequentially, performed in parallel, and/or deleted in some embodiments.

As illustrated in FIG. 5, an exemplary method 500 for training a machine learning model may include a step 510 of collecting and preparing data. Collecting and preparing data may include, e.g., acquiring, accessing, or generating training data, cleaning and pre-processing data (e.g., handling missing values, normalizing data, or encoding categorical variables), and splitting data into training data sets and validation data sets. As further illustrated in FIG. 5, an exemplary method 500 may also include a step 520 of selecting a machine learning model and architecture. Step 520 may include, e.g., selecting an appropriate machine learning algorithm or model type, defining the model architecture (e.g., number of layers, neurons, activation functions), and setting hyperparameters (e.g., learning rate, regularization). As also illustrated in FIG. 5, an exemplary method 500 may further include a step 530 of training the machine learning model using the collected and prepared data. For example, step 530 may include initializing the machine learning model with random weights and biases, iterating over the training data (e.g., performing a forward pass, calculating the loss/error between predicted output and true output, and performing a backward pass), and/or repeating iteration until convergence or a predefined stopping criterion is met. Further, as shown in FIG. 5, an exemplary method 500 may include a step 540 of evaluating the trained machine learning model. Step 540 may include, e.g., assessing the machine learning model's performance based on a validation data set (e.g., computing evaluation metrics such as accuracy, precision, recall, and/or F1-score, and/or analyzing results and adjusting model architecture). As also shown in FIG. 5, an exemplary method 500 may include a step 550 of fine-tuning the trained machine learning model (as previously described and exemplified). As shown in FIG. 5, an exemplary method 500 may also include a step 560 of deploying the trained machine learning model. For example, step 560 may include deploying the machine learning model to a production environment, monitoring the machine learning model's performance, updating the machine learning model as needed, and/or using the machine learning model to generate output based on a given input.

In yet another disclosed embodiment, an exemplary method for generating natural language text based on computer code input may comprise accessing a docstring generation model configured to generate docstrings based on computer code. A docstring generation model, as used herein, may refer to any natural language generation (NLG) machine learning model. For example, a docstring generation model may include template-based NLG models, rule-based NLG models, statistical NLG models, neural NLG models, hybrid NLG models, data-to-text NLG models, reinforcement learning NLG models, controlled NLG models, extractive NLG models, abstractive NLG models, neural machine translation models, image captioning models, chatbot NLG models, or other artificial intelligence models that provide natural language output. Accessing, as used herein, may refer to any process of obtaining, receiving, or retrieving data, information, or resources from a given source or location, which may involve an ability to connect to, enter, or log in to obtain specific content, files, functionalities, or output.

In some embodiments, a method may also comprise receiving one or more computer code samples. Receiving, as used herein, may refer to requesting, accessing, obtaining, acquiring, accepting, identifying, selecting, highlighting, and/or collecting. For example, one or more computer code samples may be received when a user highlights (or otherwise selects) at least a portion of computer code, such as by providing an input to a user interface for assessing, executing, and/or modifying code. As another example, one or more computer code samples may be received when a user inputs at least a portion of computer code into a prompt field. In some embodiments, a user may input at least a portion of computer code and natural language text into a prompt field.

In some embodiments, a method may further comprise generating, using the docstring generation model, and based on the received one or more computer code samples, one or more candidate docstrings representing natural language text, each of the one or more candidate docstrings being associated with at least a portion of the one or more computer code samples. A candidate docstring, as used herein, may refer to a potential or possible docstring which may or may not equate to an accurate description of a corresponding computer code input. In some embodiments, a higher amount of candidate docstrings provided by a docstring generation model may result in more accurate natural language outputs based on the input computer code. For example, a docstring generation model that outputs one candidate docstring in response to an input computer code provides one possible output and no other outputs which may provide other potential candidate docstrings; however, a docstring generation model that outputs 100 candidate docstrings in response to an input computer code provides 100 possible outputs, any one of which (or a combination of which) may provide an accurate description of the input computer code. The term "associated with," as used herein, may indicate a connection, relationship, correspondence, correlation, or involvement between two or more entities, concepts, or elements, and it may imply that one thing is linked to or connected with another in some way. The association may be based on various factors, such as similarity, causality, correlation, dependency, or participation.

In some embodiments, a method may also comprise identifying at least one of the one or more candidate docstrings that provides an intent of the at least a portion of the one or more computer code samples. An intent, as used herein, may refer to a goal, purpose, or description associated with computer code or a portion thereof. An intent may also refer to an intended functionality or purpose of a specific piece of code or a particular code block, in order to provide clarity and understanding for a user (e.g., a developer, administrator, student, or any other individual having a desire to read or maintain the computer code). For example, an intent of a computer code sample may generally explain the underlying function, purpose, or objective that the computer code sample (or a portion thereof) accomplishes upon execution within, or upon interaction with, a system, application, environment, or other software or hardware components. As further examples, an intent may include one or more of function-method intents (e.g., intents reflecting a purpose or action performed by a coded function or method), commented intents (e.g., text that provides information or explanations of code to convey intent of that code), class-module intents (e.g., a name of a class or module that reflects the purpose or intent of the code it entails), API endpoint intents (e.g., a name of an endpoint that reflects the purpose or intent of that endpoint), or conditional intents (e.g., a condition or associated code/text that reflects an expected behavior or threshold).

Identifying, as used herein, may refer to recognizing, distinguishing, or determining. For example, based on analyzing two candidate docstrings generated by the docstring generation model, a first candidate docstring may be found to provide an intent that is not equatable, or is less accurate (e.g., does not meet a tolerance threshold value), as compared to the actual intent indicated by the computer code sample, and a second candidate docstring may be found to provide an intent that is equatable, or is more accurate (e.g., meets a tolerance threshold value), as compared to the actual intent indicated by the computer code. In such a scenario, the second candidate docstring may be identified while the first candidate docstring may be disregarded or discarded.

In some embodiments, a method may further comprise outputting, via a user interface, the at least one identified docstring with the at least a portion of the one or more computer code samples. For example, a method may include outputting both the computer code sample and the at least one identified docstring that accurately indicates an intent of the computer code sample. As such, a user may be provided with the computer code sample in combination with an associated docstring, which may confirm to the user that the computer code sample will provide to the user a desired result, or which may provide to the user an explanation or description of the computer code sample in generated natural language. It is appreciated that in many embodiments, the human mind is not equipped to perform operations of determining an intent of a computer code sample, given its obfuscatory and digitally-based nature, which goes beyond simple evaluations.

Consistent with some disclosed embodiments, the docstring generation model may further generate a similarity between the intent and an additional natural language text. A similarity between the intent and an additional natural language text may be generated, e.g., by determining one or more of a cosine similarity, an edit distance (e.g., Levenshtein distance), a Jaro-Winkler distance, a Jaccard index, a longest common subsequence (LCS), an n-gram similarity, or a Hamming distance between the intent and the additional natural language text. An additional natural language text, as used herein, may refer to any natural language text that is not the output generated natural language description of the computer code sample. For example, a similarity between the intent (e.g., as indicated by the generated natural language description of the computer code sample) and a known value associated with the computer code sample (e.g., as indicated by training data comprising a known description of the computer code sample) may be generated. The purpose of such a generated similarity may be, e.g., to verify, confirm, or validate a correctness score. It is appreciated that such technical embodiments, which implement a solution rooted in computer technology rather than simply following rules, contribute to solving the complex problem of instantaneously (or nearly instantaneously) qualifying output provided by the docstring generation model using one or more complex statistical methods.

Consistent with some disclosed embodiments, the docstring generation model may further be trained using the outputted at least one identified docstring in association with the at least a portion of the one or more computer code samples. For example, an output of the docstring generation model in association with a corresponding computer code sample may serve as additional training data to the docstring generation model or to an additional machine learning model. As such, the method may allow for the docstring generation model to generate additional training data for itself or another machine learning model, becoming more accurate (or allowing for another machine learning model to become more accurate) as a result of self-generated training data, without requiring external data serving as additional training data. It is appreciated that combining the output of the docstring generation model (or another natural language based learning model) with that model's training (or fine-tuning) process forms a non-conventional and non-generic arrangement, which contributes to solving the technical problem of improving the accuracy and effectiveness of the model using self-generated data and without requiring the collection or preparation of any further external training data.

Consistent with some disclosed embodiments, the docstring generation model may be trained using concatenated strings, each concatenated string comprising at least two of a function signature, a reference solution, or a docstring. A concatenated string, as used herein, may refer to a sequence of strings combined, merged, joined, or associated together to create a unified or cohesive data entity. For example, a concatenated string may include two or more strings (e.g., a function signature and a reference solution, a reference solution and a docstring, a function signature and a docstring, or a function signature, reference solution, and a docstring) placed consecutively and separated by punctuation (e.g., a comma) or an operator (e.g., "+"). A function signature, as used herein, may refer to a declaration or definition of a function in a programming language. A function signature may provide information about the function, including its name, parameters (e.g., input arguments), return type, and additional modifiers or qualifiers. A function signature may serve as a contract or specification that defines the interface of the function, indicating how it should be called and what it should return. A function signature may further help other parts of a program understand how to interact with the function and may allow the program or associated device to achieve proper function overloading or polymorphism. A reference solution, as used herein, may refer to a predetermined and/or authoritative value that serves as a benchmark or standard for evaluating the correctness or quality of a generated output. For example, a reference solution may be established as a trusted or ideal representation of a problem being addressed (e.g., determining an accurate docstring to indicate an intent of a corresponding computer code sample). A reference solution may be created by experts and/or machine learning models, such as by obtaining the reference solution through extensive testing and/or deriving it from theoretical analysis. The purpose of a reference solution may be to provide a point of comparison for other solutions, allowing for evaluation, validation, or verification. As such, a reference solution may act as a baseline or standard against which alternative solutions may be measured and assessed.

Consistent with some disclosed embodiments, the docstring generation model may further be trained by minimizing a negative log-likelihood (NLL) associated with the docstring in each concatenated string. A negative log-likelihood, as used herein, may refer to a value which is calculated by taking the negative logarithm of a likelihood function. In some embodiments, a formula for the negative log likelihood may be:

$$NLL=-\log(Likelihood),$$

where NLL represents the negative log-likelihood. Minimizing the negative log-likelihood may be equivalent to maximizing a likelihood, and as such, may result in model parameters that best fit a given data set. The negative log-likelihood may thereby serve as training data by acting as a criterion for estimating model parameters and evaluating the performance of probabilistic models.

Consistent with some disclosed embodiments, identifying at least one of the one or more candidate docstrings may be based on a correctness score computed for one or more of the candidate docstrings (e.g., each candidate docstring). A correctness score, as used herein, may refer to a metric used to evaluate the performance of the docstring generation model. A correctness score may indicate the proportion of correctly classified instances or predictions compared to the total number of candidate docstrings generated by the docstring generation model. A correctness score may be expressed as a percentage, rating, or value, to provide an indication of how accurately the docstring generation model is able to predict or classify the data. As an example, to calculate a correctness score, each of the docstring generation model's predictions (i.e., each generated docstring) may be compared to one or more ground truth labels or otherwise known correct answers. In turn, each portion of a prediction that matches the ground truth label may be considered correct, while each incorrect portion of the prediction may be counted as an error. The correctness score may then be computed as:

$$\text{Correctness Score}=(\text{Number of Correct Portions}/\text{Total Number of Portions})*100.$$

As an example, if a model correctly classifies 8 out of 10 portions of a generated docstring, the correctness score may be 80%.

In some embodiments, a method may further comprise verifying (as previously described and exemplified) each of the one or more candidate docstrings. In some embodiments, verifying may include determining a correctness score (as previously described and exemplified) for each of the one or more candidate docstrings. In some embodiments, identifying (as previously described and exemplified) at least one of the one or more candidate docstrings may be based on the determined correctness score.

Consistent with some disclosed embodiments, the docstring generation model may be fine-tuned (as previously described and exemplified) based on verified candidate docstrings.

In some embodiments, a method may further comprise ranking the one or more candidate docstrings based on the determined correctness score. In some embodiments, identifying one of the one or more candidate docstrings may be based on selecting a top-k candidate docstring. A top-k candidate docstring, as used herein, may refer to one of the top or highest-ranked 'k' candidate docstrings from a full set of generated candidate docstrings, wherein selecting the top-k candidate docstrings may be based on a specific criterion or scoring mechanism (e.g., a correctness score), and wherein the 'k' represents a positive integer that indicates the number of candidate docstrings to be selected.

Consistent with some disclosed embodiments, the docstring generation model may be a trained machine learning model (as previously described and exemplified).

Consistent with some disclosed embodiments, the trained machine learning model may have between one thousand and 14 billion parameters (e.g., between 10 billion and 14 billion parameters). Of course, other amounts of parameters may be used, such as parameters numbering in the tens or hundreds of thousands, tens or hundreds of millions, or hundreds of billions. A parameter, as used herein, may refer to a variable or a set of variables that influence and/or define the machine learning model's behavior or configuration by, e.g., determining the machine learning model's ability to capture patterns and make predictions. Parameters may be adjusted during a training phase (e.g., fine-tuning phase) to minimize a predefined objective function, wherein a goal of the adjusting is to find the optimal set of parameter values that best fit the training data and generalize well to unseen data. Parameters may take different forms depending on the algorithm and problem domain. For example, parameters may be weights assigned to individual features, coefficients in a mathematical equation, thresholds for decision boundaries, or architectural choices. It is appreciated that this aspect improves natural-language-based learning model training, output, and accuracy by including a high number of parameters which would not be possible to otherwise combine (e.g., in the human mind).

Consistent with some disclosed embodiments, the trained machine learning model may comprise a plurality of layers each having a transformer decoder architecture (as previously described and exemplified).

Consistent with some disclosed embodiments, the transformer decoder architecture may include at least one masked self-attention head and/or at least one feed-forward network. Self-attention heads, as used herein, may refer to subsequences (e.g., heads) which represent different perspectives or attention distributions. A self-attention head may perform a weighted summation of input sequence elements, assigning different weights or importance to different positions based on their relevance to each other. For example, within a self-attention head, an input sequence may be transformed into three vectors: Query, Key, and Value. These vectors may be derived from the input sequence using learned linear transformations. The Query vector may represent the position being attended to, the Key vectors may represent all positions in the input sequence, and the Value vectors may hold the information or features associated with each position. A self-attention mechanism may then compute a weighted sum of the Value vectors, wherein the weights are determined by the compatibility (or similarity) between the Query and Key vectors. The resulting weighted sum may thereby represent the output of the self-attention head for a specific position. A masked self-attention head, as used herein, may refer to a variant of self-attention, wherein the machine learning model should not have access to future information during training or inference and/or wherein the machine learning model needs to generate output sequentially. Masked self-attention heads may achieve this by introducing a mask that blocks the attention from attending to future positions. The mask may be, e.g., an upper triangular matrix, wherein each element above the main diagonal is set to a very large negative value (or minus infinity). This in turn causes a softmax operation in the attention mechanism to assign a near-zero weight to future positions, effectively blocking their influence.

A feed-forward network (e.g., a fully connected network or a multilayer perceptron (MLP)), as used herein, may refer to an artificial neural network comprising multiple layers of interconnected nodes, wherein multiple nodes (e.g., each node) in a given layer is connected to multiple nodes (e.g., every node) in a subsequent layer. In a feed-forward network, information may flow in a unidirectional manner, from an input layer through one or more hidden layers to an output layer. Each node (e.g., a neuron or unit) in the one or more hidden layers may apply an activation function to a weighted sum of inputs received at that node from a previous layer. In turn, the weights associated with each connection may comprise the learnable parameters of the network that may be adjusted during the training process.

Consistent with some disclosed embodiments, the docstring generation model may be fine-tuned based on at least one public web source or software repository (as previously described and exemplified).

Consistent with some disclosed embodiments, the docstring generation model may be fine-tuned based on a set of training data constructed from examples within the at least one public web source or software repository (as previously described and exemplified).

Consistent with some disclosed embodiments, identifying at least one of the one or more candidate docstrings may further be based on a mean-log probability (as previously described and exemplified).

Consistent with some disclosed embodiments, the docstring generation model may be developed by applying training data comprising annotated computer code to a precursor model comprising a machine learning model trained on natural language prompts (as previously described and exemplified).

In some embodiments, a method may further comprise training a machine learning model used for generating computer code based on natural language input using training data comprising the outputted at least one identified docstring in association with the at least a portion of the one or more computer code samples. For example, an output of the docstring generation model in association with a corresponding computer code sample may serve as additional training data to a trained machine learning model for generating computer code based on natural language input. As such, the method may allow for the docstring generation model to generate additional training data for another machine learning model, causing the machine learning model to become more accurate as a result of auto-generated training data, without requiring external data to serve as additional training data. It is appreciated that combining the output of the docstring generation model (or another natural language based learning model) with a training process for another machine learning model forms a non-conventional and non-generic arrangement, which contributes to solving the technical problem of improving the accuracy and effectiveness of the other machine learning model without requiring further external training data.

According to disclosed embodiments, such as by including aspects of embodiments described above, an exemplary system may include at least one memory storing instructions and at least one processor configured to execute the instructions to perform a set of operations for generating natural language text based on computer code input. The set of operations may mirror one or more of the steps of the method 200 described herein. As such, the system may be configured for accessing a docstring generation model configured to generate docstrings based on computer code input. The system may further be configured for receiving one or more computer code samples. The system may further be configured for generating, using the docstring generation model, and based on the received computer code sample(s), candidate docstrings representing natural language text, the candidate docstrings being associated with a computer code sample. In some embodiments, the system may also be configured for identifying candidate docstring(s) that provide an intent of the computer code sample(s). Further, the system may be configured for outputting, via a user interface, the identified docstring(s) with one or more associated computer code samples. The system may also be configured for further training the docstring generation model, or another model, based on the output.

According to another embodiment of the present disclosure, a non-transitory computer readable medium comprising instructions to perform steps for generating natural language text based on computer code input. The steps embodied in the instructions of the non-transitory computer readable medium may mirror one or more of the steps of the method 200 described herein. As such, the steps may be configured for accessing a docstring generation model configured to generate docstrings based on computer code input. The steps may further be configured for receiving one or more computer code samples. The steps may further be configured for generating, using the docstring generation model, and based on the received computer code sample(s), candidate docstrings representing natural language text, the candidate docstrings being associated with a computer code sample. In some embodiments, the steps may also be configured for identifying candidate docstring(s) that provide an intent of the computer code sample(s). In some embodiments, the steps may further be configured for outputting, via a user interface, the identified docstring(s) with one or more associated computer code samples. The system may also be configured for further training the docstring generation model, or another model, based on the output.

The present disclosure may be used to perform a range of natural language processing tasks related to code. Example tasks include summarization (e.g., generating summaries of code to provide a high-level overview of its functionality), translation (e.g., translating code comments and documentation into multiple languages, which may be useful for developers who are working with international teams or developing applications for users who speak different languages), code documentation (e.g., generating documentation for code, including descriptions of functions, variables, and classes, which may be used to help other developers understand the code and how it works), question-answering (e.g., answering questions about code, such as "What is this function doing?" or "How is this variable used?", which may be useful for developers who are trying to understand code written by others or developers who are working with legacy code), and code completion (e.g., suggesting code completions based on natural language descriptions).

Using the present disclosure to generate natural language based on computer code input may have a number of applications in areas including software documentation, chatbots, and natural language processing. Example applications may include automated code documentation (e.g., automatically generating documentation for software code, which may help developers more easily understand how the code works and how to use it correctly), chatbots and virtual assistants (e.g., generating natural language responses for chatbots and virtual assistants, which may help make them more natural and engaging), code comments and annotations (e.g., automatically generating comments and annotations for code, thereby helping other developers understand the code more easily), technical writing (e.g., generating technical writing, such as blog posts, articles, and whitepapers, based on code, which may help explain complex technical concepts in a more accessible and understandable way), code-to-speech (e.g., generating natural language audio descriptions of code, which may be useful for visually impaired developers who rely on audio descriptions to understand code), code summarization (e.g., generating natural language summaries of code, which can be useful for quickly understanding the purpose and functionality of a codebase), and automated error messages (e.g., generating natural language error messages that are easier for users to understand, which may help reduce frustration and improve user experience).

Reference will now be made to FIGS. 2, 4, and 6-8, which illustrate exemplary embodiments of the present disclosure.

Figure 2:
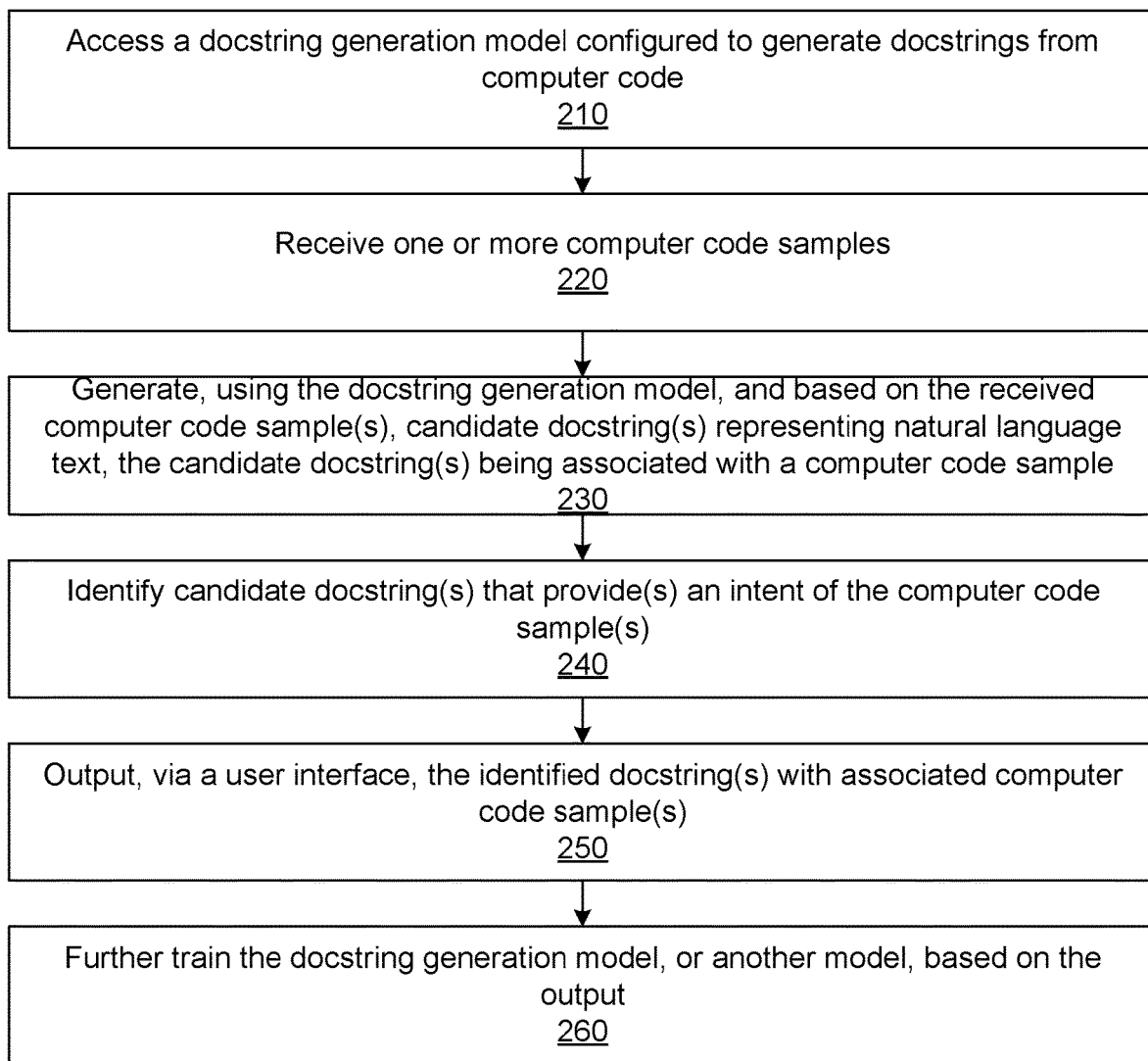
FIG. 2 is a flow diagram which illustrates another exemplary method according to some embodiments of the present disclosure.

An exemplary method 200 for generating natural language text based on computer code input, consistent with disclosed embodiments, is illustrated in FIG. 2. The process shown in FIG. 2 or any of its constituent steps may be implemented using operating environment 700, system 800 (e.g., using at least one processor and at least one memory component), or any component thereof. The steps illustrated in FIG. 2 are exemplary and steps may be added, merged, divided, duplicated, repeated (e.g., as part of a machine learning process), modified, performed sequentially, performed in parallel, and/or deleted in some embodiments.

As illustrated in FIG. 2, an exemplary method 200 may include a step 210 of accessing a docstring generation model configured to generate docstrings based on computer code input. As further illustrated in FIG. 2, an exemplary method 200 may also include a step 220 of receiving one or more computer code samples. As also illustrated in FIG. 2, an exemplary method 200 may further include a step 230 of generating, using the docstring generation model, and based on the received computer code sample(s), candidate docstrings representing natural language text, the candidate docstrings being associated with a computer code sample. Further, as shown in FIG. 2, an exemplary method 200 may include a step 240 of identifying candidate docstring(s) that provide an intent of the computer code sample(s). As also shown in FIG. 2, an exemplary method 200 may include a step 250 of outputting, via a user interface, the identified docstring(s) with one or more associated computer code samples. As shown in FIG. 2, an exemplary method 200 may also include a step 260 of further training the docstring generation model, or another model, based on the output.

Figure 4:
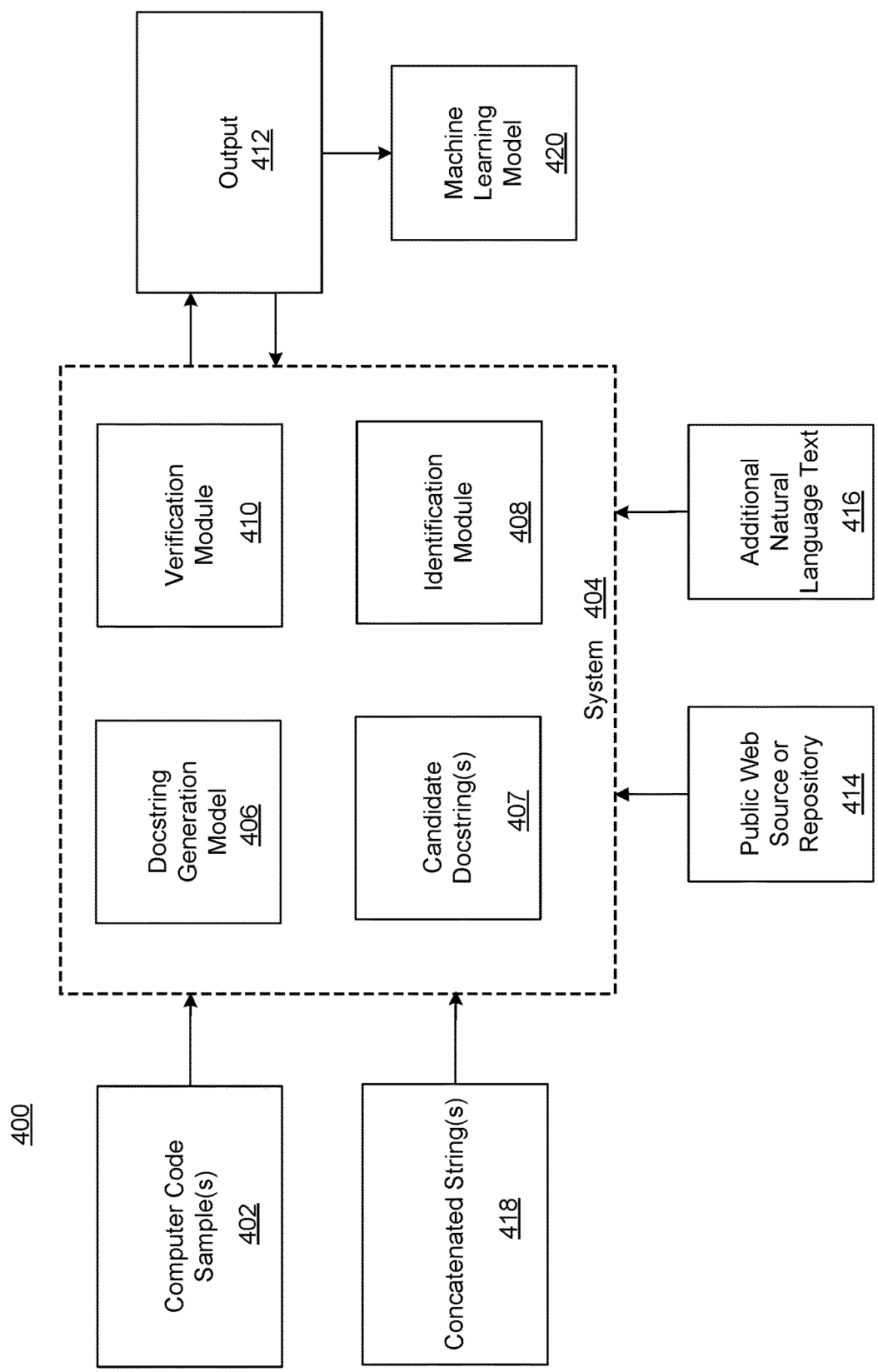
FIG. 4 is a block diagram illustrating an exemplary system for generating natural language from computer code input, according to some embodiments of the present disclosure.

FIG. 4 is a functional block diagram that describes an exemplary operating environment 400 for implementing the method of FIG. 2, according to some embodiments of the present disclosure. In some embodiments, the operating environment 400 may include a system 404 comprising at least one memory storing instructions (not shown) and at least one processor (not shown) configured to execute the instructions to perform a set of operations for generating natural language text based on computer code input. System 404 may be an instance of and/or include features of system 500. The set of operations may mirror one or more of the steps of the method 200 described herein. As such, the system 404 may be configured for accessing a docstring generation model 406 configured to generate docstrings based on computer code input. In some embodiments, the docstring generation model 406 may be trained using data from a public web source and/or repository 414, additional natural language text 416, and/or one or more concatenated strings 418. The system 404 may further be configured for receiving one or more computer code samples 402 as the computer code input. The system 404 may further be configured for generating, using the docstring generation model 406, and based on the received computer code sample(s) 402, one or more candidate docstrings 407 representing natural language text, the candidate docstrings 407 being associated with a computer code sample 402. The system 404 may further be configured for verifying each candidate docstring 407 via verification module 410. In some embodiments, the system 404 may also be configured for identifying, via identification module 408, candidate docstring(s) that provide an intent of the received computer code sample (s) 402. Further, the system 404 may be configured for outputting, via a user interface, an output 412 comprising the identified docstring(s) with one or more associated computer code samples. The system 404 may also be configured for further training the docstring generation model 406, or another model 420, based on the output 412.

Figure 6:
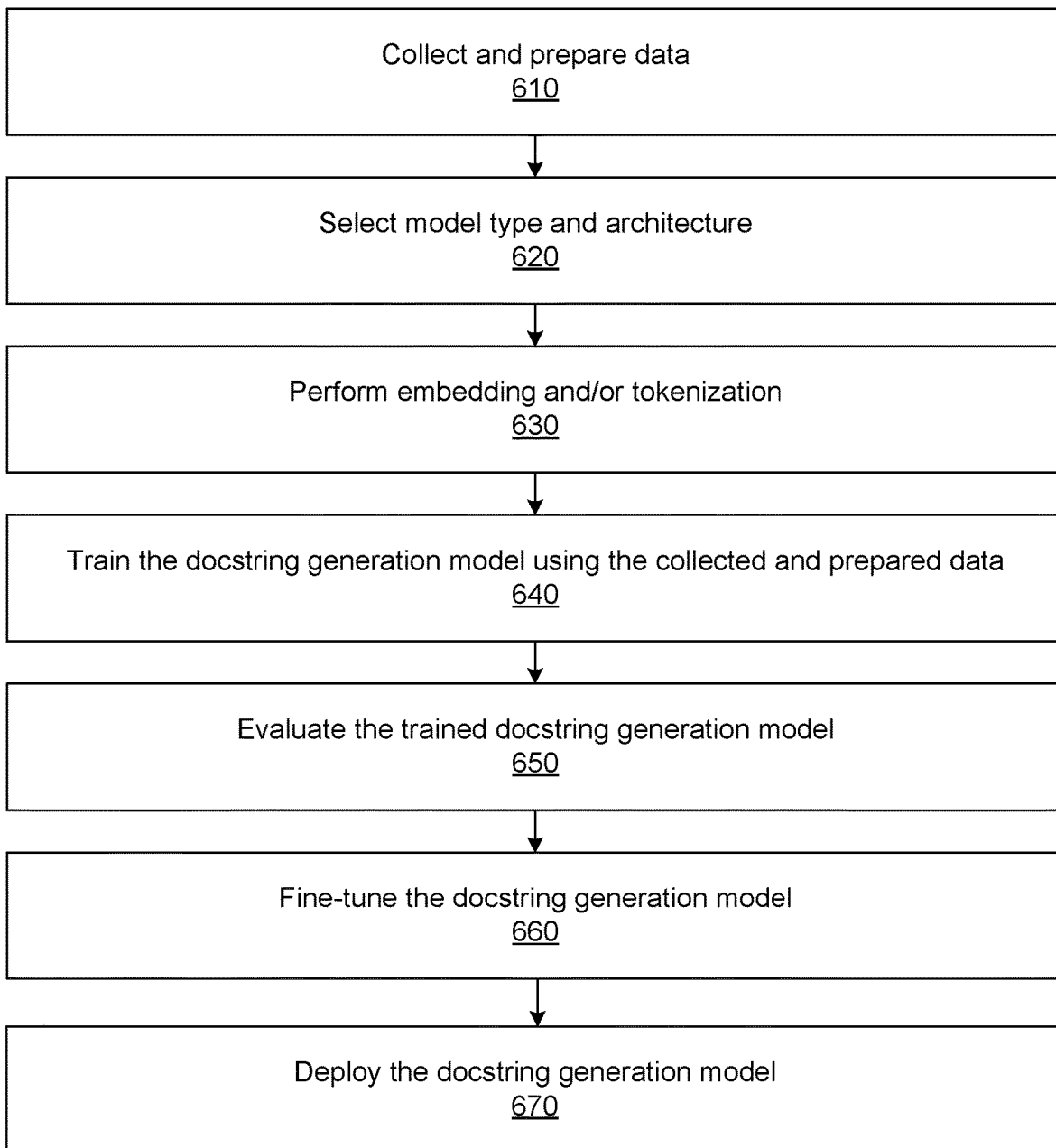
FIG. 6 is a flow diagram which illustrates an exemplary method for training a docstring generation model, according to some disclosed embodiments.

An exemplary method 600 for training a docstring generation model, consistent with disclosed embodiments, is illustrated in FIG. 6. In some embodiments, the docstring generation model may be trained such that it may be configured to generate natural language based on computer code input as discussed herein. The process shown in FIG. 6 or any of its constituent steps may be implemented using operating environment 700, system 800 (e.g., using at least one processor and at least one memory component), or any component thereof. The steps illustrated in FIG. 6 are exemplary and steps may be added, merged, divided, duplicated, repeated (e.g., as part of a machine learning process), modified, performed sequentially, performed in parallel, and/or deleted in some embodiments.

As illustrated in FIG. 6, an exemplary method 600 for training a docstring generation model may include a step 610 of collecting and preparing data. Collecting and preparing data may include, e.g., acquiring, accessing, or generating training data including computer code samples and corresponding docstrings, cleaning and pre-processing the training data (e.g., handling missing values, normalizing data, encoding categorical variables, removing special characters), and splitting data into training data sets and validation data sets. As further illustrated in FIG. 6, an exemplary method 600 may also include a step 620 of selecting a model type and architecture. Step 620 may include, e.g., selecting an appropriate sequence-to-sequence model architecture (e.g., LSTM, Transformer), defining the model architecture (e.g., encoder and decoder components), and setting hyperparameters (e.g., learning rate, regularization, batch size, maximum sequence length). As also illustrated in FIG. 6, an exemplary method 600 may further include a step 630 of performing embedding and/or tokenization. Step 630 may include, e.g., converting the training data into numerical representations, applying word embedding techniques (e.g., Word2Vec, GloVe) to capture semantic relationships, tokenizing text into subword units, and/or tokenizing text using a vocabulary mapping. As further illustrated in FIG. 6, an exemplary method 600 may further include a step 640 of training the docstring generation model using the collected and prepared data. For example, step 640 may include initializing the docstring generation model with random weights and/or biases, iterating over the training data (e.g., performing a forward pass, feeding the embedding to the decoder to generate a predicted docstring, calculating the loss/cross-entropy between the predicted docstring and target docstring, and performing a backward pass), and/or repeating iteration until convergence or a predefined stopping criterion is met. Further, as shown in FIG. 6, an exemplary method 600 may include a step 650 of evaluating the trained docstring generation model. Step 650 may include, e.g., assessing the docstring generation model's performance based on a validation data set (e.g., computing evaluation metrics such as accuracy, precision, BLEU score, ROUGE score, and/or analyzing results and adjusting model architecture). As also shown in FIG. 6, an exemplary method 600 may include a step 660 of fine-tuning the trained docstring generation model (fine-tuning may be defined as previously described and exemplified). In some embodiments, the trained docstring generation model be configured to perform operations discussed with respect to FIG. 1, or other model operations discussed herein. As shown in FIG. 6, an exemplary method 600 may also include a step 670 of deploying the trained docstring generation model. For example, step 670 may include deploying the docstring generation model to a production environment, monitoring the docstring generation model's performance, updating the docstring generation model as needed, and/or using the docstring generation model to generate output based on a given input.

Figure 7:
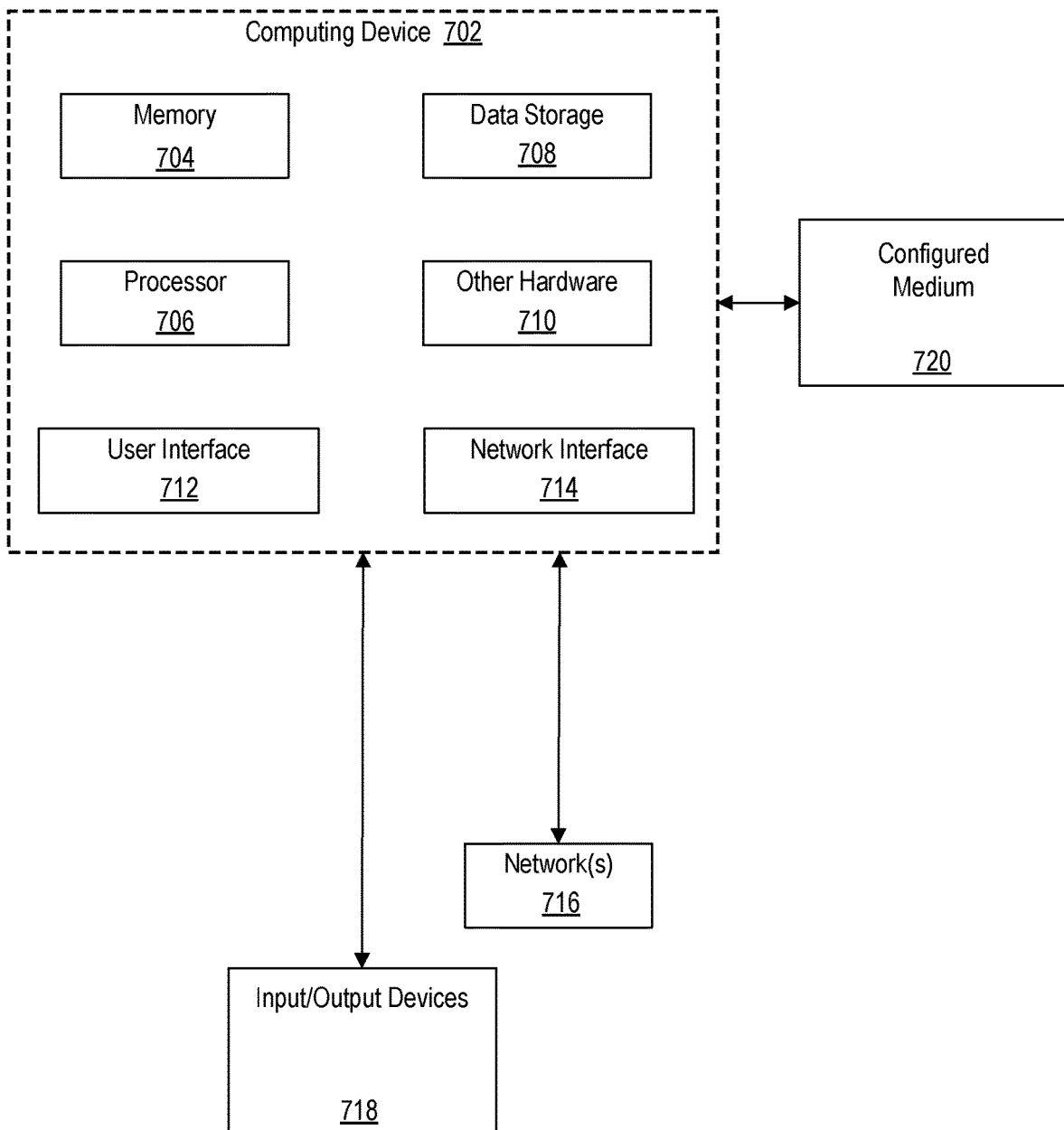
FIG. 7 is a block diagram illustrating an exemplary operating environment for implementing various aspects of this disclosure, according to some embodiments of the present disclosure.

An exemplary operating environment for implementing various aspects of this disclosure is illustrated in FIG. 7. As illustrated in FIG. 7, an exemplary operating environment 700 may include a computing device 702 (e.g., a general-purpose computing device) in the form of a computer. In some embodiments, computing device 702 may be associated with a user. Components of the computing device 702 may include, but are not limited to, various hardware components, such as one or more processors 706, data storage 708, a system memory 704, other hardware 710, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 7, an operating environment 700 for an exemplary embodiment includes at least one computing device 702. The computing device 702 may be a uniprocessor or multiprocessor computing device. An operating environment 700 may include one or more computing devices (e.g., multiple computing devices 702) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 702 may be configured for end-users, e.g., with applications, for administrators, as a server, as a distributed processing node, as a special-purpose processing device, or otherwise configured to train machine learning models and/or use machine learning models. In some embodiments, multiple computing devices 702 (e.g., a network of GPUs) may be configured to train a machine learning model.

One or more users may interact with the computer system comprising one or more computing devices 702 by using a display, keyboard, mouse, microphone, touchpad, camera, sensor (e.g., touch sensor) and other input/output devices 718, via typed text, touch, voice, movement, computer vision, gestures, and/or other forms of input/output. An input/output device 718 may be removable (e.g., a connectable mouse or keyboard) or may be an integral part of the computing device 702 (e.g., a touchscreen, a built-in microphone). A user interface 712 may support interaction between an embodiment and one or more users. A user interface 712 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touchscreen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 718 and computing device 702, based on input received from at user interface 712 and/or from network(s) 716. As used throughout, "based on" may refer to being established or founded upon a use of, changed by, influenced by, caused by, dependent upon, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 702 in other embodiments, depending on their detachability from the processor(s) 706. Other computerized devices and/or systems not shown in FIG. 7 may interact in technological ways with computing device 702 or with another system using one or more connections to a network 716 via a network interface 714, which may include network interface equipment, such as a physical network interface controller (NIC) or a virtual network interface (VIF).

Computing device 702 includes at least one logical processor 706. The at least one logical processor 706 may include circuitry and transistors configured to execute instructions from memory (e.g., memory 704). For example, the at least one logical processor 706 may include one or more central processing units (CPUs), arithmetic logic units (ALUs), Floating Point Units (FPUs), and/or Graphics Processing Units (GPUs). The computing device 702, like other suitable devices, also includes one or more computer-readable storage media, which may include, but are not limited to, memory 704 and data storage 708. In some embodiments, memory 704 and data storage 708 may be part of a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 720 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 702, making its content accessible for interaction with and use by processor(s) 706. The removable configured medium 720 is an example of a computer-readable storage medium. Some other examples of computer-readable storage media include built-in random access memory (RAM), read-only memory (ROM), hard disks, and other memory storage devices which are not readily removable by users (e.g., memory 704).

The configured medium 720 may be configured with instructions (e.g., binary instructions) that are executable by a processor 706; "executable" is used in a broad sense herein to include machine code, interpretable code, bytecode, compiled code, and/or any other code that is configured to run on a machine, including a physical machine or a virtualized computing instance (e.g., a virtual machine or a container). The configured medium 720 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 710 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 706, memory 704, data storage 708, and screens/displays, an operating environment 700 may also include other hardware 710, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 718 such as human user input/output devices (screen, keyboard, mouse, tablet, microphone, speaker, motion sensor, etc.) will be present in operable communication with one or more processors 706 and memory.

In some embodiments, the system includes multiple computing devices 702 connected by network(s) 716. Networking interface equipment can provide access to network(s) 716, using components (which may be part of a network interface 714) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 702 may operate in a networked or cloud-computing environment using logical connections to one or more remote devices (e.g., using network(s) 716), such as a remote computer (e.g., another computing device 702). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 702 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Computing device 702 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 708 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 708 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for generating computer code or natural language using language models trained on computer code. For example, in some embodiments, and as illustrated in FIG. 7, an operating environment 700 may include at least one computing device 702, the at least one computing device 702 including at least one processor 706, at least one memory 704, at least one data storage 708, and/or any other component discussed above with respect to FIG. 7.

FIG. 8 is a block diagram illustrating an exemplary machine learning platform for implementing various aspects of this disclosure, according to some embodiments of the present disclosure.

System 800 may include data input engine 810 that can further include data retrieval engine 804 and data transform engine 806. Data retrieval engine 804 may be configured to access, access, interpret, request, or receive data, which may be adjusted, reformatted, or changed (e.g., to be interpretable by other engine, such as data input engine 810). For example, data retrieval engine 804 may request data from a remote source using an API. Data input engine 810 may be configured to access, interpret, request, format, re-format, or receive input data from data source(s) 802. For example, data input engine 810 may be configured to use data transform engine 806 to execute a re-configuration or other change to data, such as a data dimension reduction. Data source(s) 802 may exist at one or more memories 704 and/or data storages 708. In some embodiments, data source(s) 802 may be associated with a single entity (e.g., organization) or with multiple entities. Data source(s) 802 may include one or more of training data 802a (e.g., input data to feed a machine learning model as part of one or more training processes), validation data 802b (e.g., data against which at least one processor may compare model output with, such as to determine model output quality), and/or reference data 802c. In some embodiments, data input engine 810 can be implemented using at least one computing device (e.g., computing device 702). For example, data from data sources 802 can be obtained through one or more I/O devices and/or network interfaces. Further, the data may be stored (e.g., during execution of one or more operations) in a suitable storage or system memory. Data input engine 810 may also be configured to interact with data storage 708, which may be implemented on a computing device that stores data in storage or system memory. System 800 may include featurization engine 820. Featurization engine 820 may include feature annotating & labeling engine 812 (e.g., configured to annotate or label features from a model or data, which may be extracted by feature extraction engine 814), feature extraction engine 814 (e.g., configured to extract one or more features from a model or data), and/or feature scaling and selection engine 816. Feature scaling and selection engine 816 may be configured to determine, select, limit, constrain, concatenate, or define features (e.g., AI features) for use with AI models. System 800 may also include machine learning (ML) modeling engine 830, which may be configured to execute one or more operations on a machine learning model (e.g., model training, model re-configuration, model validation, model testing), such as those described in the processes described herein. For example, ML modeling engine 830 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 802a) through a machine learning model process (e.g., a training process). In some embodiments, different epochs may have different degrees of supervision (e.g., supervised, semi-supervised, or unsupervised). Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, trillions, or even billions of model parameters. ML modeling engine 830 may include model selector engine 832 (e.g., configured to select a model from among a plurality of models, such as based on input data), parameter selector engine 834 (e.g., configured to add, remove, and/or change one or more parameters of a model), and/or model generation engine 836 (e.g., configured to generate one or more machine learning models, such as according to model input data, model output data, comparison data, and/or validation data). Similar to data input engine 810, featurization engine 820 can be implemented on a computing device. In some embodiments, model selector engine 832 may be configured to receive input and/or transmit output to ML algorithms database 890 (e.g., a data storage 708). Similarly, featurization engine 820 can utilize storage or system memory for storing data and can utilize one or more I/O devices or network interfaces for transmitting or receiving data. ML algorithms database 890 (or other data storage 708) may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 800 can further include predictive output generation engine 840, output validation engine 850 (e.g., configured to apply validation data to machine learning model output), feedback engine 870 (e.g., configured to apply feedback from a user and/or machine to a model), and model refinement engine 860 (e.g., configured to update or re-configure a model). In some embodiments, feedback engine 870 may receive input and/or transmit output (e.g., output from a trained, partially trained, or untrained model) to outcome metrics database 880. Outcome metrics database 880 may be configured to store output from one or more models, and may also be configured to associate output with one or more models. In some embodiments, outcome metrics database 880, or other device (e.g., model refinement engine 860 or feedback engine 870) may be configured to correlate output, detect trends in output data, and/or infer a change to input or model parameters to cause a particular model output or type of model output. In some embodiments, model refinement engine 860 may receive output from predictive output generation engine 840 or output validation engine 850. In some embodiments, model refinement engine 860 may transmit the received output to featurization engine 820 or ML modeling engine 830 in one or more iterative cycles.

Any or each engine of system 800 may be a module (e.g., a program module), which may be a packaged functional hardware unit designed for use with other components or a part of a program that performs a particular function (e.g., of related functions). Any or each of these modules may be implemented using a computing device. In some embodiments, the functionality of system 800 may be split across multiple computing devices to allow for distributed processing of the data, which may improve output speed and reduce computational load on individual devices. In some embodiments, system 800 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 800 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A computer-implemented method, comprising:
    training a machine learning model to generate natural language docstrings from computer code;
    receiving one or more computer code samples at the trained machine learning model;
    generating, via the trained machine learning model and based on the received one or more computer code samples, one or more candidate natural language docstrings representing natural language text, each of the one or more candidate natural language docstrings being associated with at least a portion of the one or more computer code samples;
    identifying at least one of the one or more candidate natural language docstrings that provides an intent of the at least a portion of the one or more computer code samples;
    outputting from the trained machine learning model the at least one identified natural language docstring with the at least a portion of the one or more computer code samples; and
    receiving, at the machine learning model, a selection of the one or more computer code samples, wherein the machine learning model provides an automatic description of the selection and generates a template for building an additional machine learning model.

2. The method of claim 1, wherein the machine learning model further generates a similarity between the intent and an additional natural language text.

3. The method of claim 2, wherein the machine learning model is further trained using the outputted at least one identified natural language docstring in association with the at least a portion of the one or more computer code samples.

4. The method of claim 1, wherein the machine learning model is trained using concatenated strings, each concatenated string comprising at least two of a function signature, a reference solution, or a docstring.

5. The method of claim 1, wherein identifying at least one of the one or more candidate natural language docstrings is based on a correctness score computed for at least one natural language candidate docstring, the correctness score indicating a proportion of correctly classified instances compared to a total number of candidate natural language docstrings generated.

6. The method of claim 1, further comprising verifying each of the one or more natural language candidate docstrings, wherein verifying includes determining a correctness score for each of the one or more candidate natural language docstrings, wherein the identifying at least one of the one or more candidate natural language docstrings is based on the determined correctness score.

7. The method of claim 6, wherein the machine learning model is fine-tuned based on verified candidate natural language docstrings.

8. The method of claim 6, further comprising ranking the one or more candidate natural language docstrings based on the determined correctness score, wherein identifying one of the one or more candidate natural language docstrings is based on selecting a top-k candidate natural language docstring.

9. The method of claim 1, wherein the at least one identified natural language docstring and the at least a portion of the one or more computer code samples are output via an application programming interface (API).

10. The method of claim 1, wherein the trained machine learning model has between 10 billion and 14 billion parameters.

11. The method of claim 1, wherein the trained machine learning model comprises a plurality of layers, at least one of the layers having a transformer decoder architecture.

12. The method of claim 1, wherein the machine learning model further suggests a change to improve existing code within the received one or more computer code samples.

13. The method of claim 1, wherein the machine learning model is fine-tuned based on at least one public web source or software repository.

14. The method of claim 13, wherein the machine learning model is fine-tuned based on a set of training data constructed from examples within the at least one public web source or software repository.

15. The method of claim 1, wherein identifying at least one of the one or more candidate natural language docstrings is further based on a mean-log probability.

16. The method of claim 1, wherein the machine learning model is developed by applying training data comprising annotated computer code to a precursor model comprising a machine learning model trained on natural language prompts.

17. The method of claim 1, further comprising training a machine learning model used for generating computer code based on natural language input using training data comprising the outputted at least one identified natural language docstring in association with the at least a portion of the one or more computer code samples.

18. A system comprising:
at least one memory storing instructions;
at least one processor configured to execute the instructions to perform operations comprising:
training a machine learning model to generate natural language docstrings from computer code;
receiving one or more computer code samples at the trained machine learning model;
generating, via the trained machine learning model and based on the received one or more computer code samples, one or more candidate natural language docstrings representing natural language text, each of the one or more candidate natural language docstrings being associated with at least a portion of the one or more computer code samples;
identifying at least one of the one or more candidate natural language docstrings that provides an intent of the at least a portion of the one or more computer code samples;
outputting from the trained machine learning model the at least one identified natural language docstring with the at least a portion of the one or more computer code samples; and
receiving, at the machine learning model, a selection of the one or more computer code samples, wherein the machine learning model provides an automatic description of the selection and generates a template for building an additional machine learning model.

19. A non-transitory computer-readable medium including instructions that are executable by one or more processors to perform operations comprising:
training a machine learning model to generate natural language docstrings from computer code;
receiving one or more computer code samples at the trained machine learning model;
generating, via the trained machine learning model and based on the received one or more computer code samples, one or more candidate natural language docstrings representing natural language text, each of the one or more candidate natural language docstrings being associated with at least a portion of the one or more computer code samples;
identifying at least one of the one or more candidate natural language docstrings that provides an intent of the at least a portion of the one or more computer code samples;
outputting from the trained machine learning model the at least one identified natural language docstring with the at least a portion of the one or more computer code samples; and
receiving, at the machine learning model, a selection of the one or more computer code samples, wherein the machine learning model provides an automatic description of the selection and generates a template for building an additional machine learning model.

* * * * *